United States Patent
Kim et al.

(10) Patent No.: US 10,616,731 B2
(45) Date of Patent: Apr. 7, 2020

(54) HOPPING METHOD IN V2X COMMUNICATION AND DEVICE THEREFOR

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 16/067,460

(22) PCT Filed: Jan. 4, 2017

(86) PCT No.: PCT/KR2017/000101
§ 371 (c)(1),
(2) Date: Jun. 29, 2018

(87) PCT Pub. No.: WO2017/119716
PCT Pub. Date: Jul. 13, 2017

(65) Prior Publication Data
US 2019/0028863 A1 Jan. 24, 2019

Related U.S. Application Data

(60) Provisional application No. 62/274,781, filed on Jan. 5, 2016.

(51) Int. Cl.
*H04W 4/40* (2018.01)
*H04L 5/00* (2006.01)
(Continued)

(52) U.S. Cl.
CPC ............. *H04W 4/40* (2018.02); *H04L 5/0012* (2013.01); *H04W 72/10* (2013.01); *H04W 88/02* (2013.01)

(58) Field of Classification Search
None
See application file for complete search history.

(56) References Cited

U.S. PATENT DOCUMENTS

| 10,476,723 | B2 * | 11/2019 | Chang | H04W 56/001 |
| 2004/0131016 | A1 * | 7/2004 | Hundal | H04B 7/2621 |
| | | | | 370/252 |

(Continued)

FOREIGN PATENT DOCUMENTS

| KR | 10-2015-0133115 A | 11/2015 |
| WO | WO 2015/142632 A1 | 9/2015 |

OTHER PUBLICATIONS

Beijing Xinwei Telecom Techn., "V2X Resource Allocation with Cooperative Diversity," 3GPP TSG RAN WG1 Meeting #82bis, R1-155045, Malmö, Sweden, Oct. 5-9, 2015, 5 pages.

(Continued)

*Primary Examiner* — Otis L Thompson, Jr.
(74) *Attorney, Agent, or Firm* — Birch, Stewart, Kolasch & Birch, LLP

(57) ABSTRACT

A hopping method for a terminal in vehicle-to-something (V2X) communication is disclosed. The terminal can perform hopping in a preset sized unit and allocate a remaining resource to a resource continuing to a hopped resource. When collision with a transmission resource of another terminal occurs after hopping, some transmission resources can be omitted on the basis of a hopping unit resource of a preset order and/or priority.

14 Claims, 19 Drawing Sheets

(51) Int. Cl.
*H04W 72/10* (2009.01)
*H04W 88/02* (2009.01)

(56) References Cited

U.S. PATENT DOCUMENTS

| | | | | |
|---|---|---|---|---|
| 2004/0203727 | A1* | 10/2004 | Abiri | H04W 16/06 455/423 |
| 2010/0202400 | A1* | 8/2010 | Richardson | H04W 8/005 370/330 |
| 2013/0022053 | A1* | 1/2013 | Vasseur | H04L 47/10 370/428 |
| 2013/0022083 | A1* | 1/2013 | Vasseur | H04W 74/0808 375/132 |
| 2013/0202013 | A1* | 8/2013 | Van Stralen | H04W 72/02 375/133 |
| 2015/0270868 | A1* | 9/2015 | Park | H04W 28/0289 370/329 |
| 2017/0127413 | A1* | 5/2017 | Guan | H04W 72/0446 |
| 2017/0207815 | A1* | 7/2017 | Chae | H04L 5/00 |
| 2018/0359787 | A1* | 12/2018 | Lee | H04W 72/02 |
| 2019/0045372 | A1* | 2/2019 | Niu | H04W 16/14 |
| 2019/0306923 | A1* | 10/2019 | Xiong | H04L 5/0005 |

OTHER PUBLICATIONS

Nokia Networks, "Frequency Hopping for UEs in Coverage Enhancement," 3GPP TSG-RAN WG1 Meeting #82, R1-153823, Beijing, P.R.China, Aug. 24-28, 2015, 3 pages.
Nokia Networks, "Remaining Details of Frequency Hopping for MTC," 3GPP TSG-RAN WG1 Meeting #83, R1-156638, Anaheim, USA, Nov. 15-22, 2015, 3 pages.
Bilal et al., "Fastest-Vehicle Multi-hop Routing in Vehicular Ad hoc Networks", 10th IEEE International Conference on Computer and Information Technology, 2010, pp. 773-778.

* cited by examiner (b)

(a)

(b)

(a)

(b)

HOPPING METHOD IN V2X COMMUNICATION AND DEVICE THEREFOR

CROSS-REFERENCE TO RELATED APPLICATIONS

This application is the National Phase of PCT International Application No. PCT/KR2017/000101, filed on Jan. 4, 2017, which claims priority under 35 U.S.C. 119(e) to U.S. Provisional Application No. 62/274,781, filed on Jan. 5, 2016, all of which are hereby expressly incorporated by reference into the present application.

TECHNICAL FIELD

The present invention relates to a wireless communication system, and more particularly, to a method of performing hopping in a V2X (vehicle-to-something) communication and an apparatus therefor.

BACKGROUND ART

According to intelligent transportation systems (ITS), many ongoing efforts are made to research and develop methods for exchanging various informations such as real-time traffic information and/or safety warning between vehicles. For example, ongoing efforts are made to research and develop vehicle communications for a proximity service (ProSe) and a public warning system. A communication interface for a vehicle can be commonly called V2X (vehicle-to-x). V2X communication may be categorized into V2V (vehicle-to-vehicle) communication, V2P (vehicle-to-pedestrian) communication, and V2I (vehicle-to-infrastructure entity) communication. V2V communication may refer to communication between vehicles. V2P communication may refer to communication between a vehicle and a personally carried device (e.g., a handheld terminal of a pedestrian or a bicycle rider). And, V2I communication may refer to communication between a vehicle and a roadside unit (RSU). RSU may refer to a traffic infrastructure entity. For example, RSU may include an entity that transmits a speed notification. For V2X communication, a vehicle, an RSU and a handheld device may be equipped with a transceiver.

As describe above, V2X communication may be used to indicate warnings for various events such as safety and the like. For example, information on an event occurring on a vehicle or road may be notified to another vehicle or pedestrians through V2X communication. For example, information on a warning of a traffic accident, a road situation change, or an accident danger may be forwarded to another vehicle or pedestrian. For example, a pedestrian, who is adjacent to or crossing a road, can be informed of information on vehicle approach.

However, since a vehicle moves at higher speed than a pedestrian, the V2X communication may have relatively low reliability. For example, a phase may be sharply changed due to the Doppler effect. In addition, a channel state may also be changed rapidly due to vehicle movement. Hence, to cope with the rapidly changed channel state, a method capable of achieving high reliability of communication is required.

The present invention is proposed to solve the above-described problems, and particularly, the invention discloses a method for ensuring stable communication in various types of communication including V2X communication.

DISCLOSURE OF THE INVENTION

Technical Task

A technical task of the present invention is to provide a method of performing hopping in a V2X communication and an apparatus therefor.

Technical Solution

To achieve these and other advantages and in accordance with the purpose of the present invention, as embodied and broadly described, according to one embodiment, a method of performing hopping, which is performed by a first user equipment (UE) in a V2X (vehicle-to-something) communication, includes the steps of transmitting a first message using a first transmission resource, determining a second transmission resource for transmitting a second message by hopping a first hopping unit resource of the first transmission resource according to a predetermined hopping rule, and if the second transmission resource is collided with a $k^{th}$ hopping unit resource of a transmission resource of a second UE, dropping at least a part of transmission of the second transmission resource. In this case, the second transmission resource includes the hopped first hopping unit resource and at least one hopping unit resource contiguous to the hopped first hopping unit resource on a time axis and the k may correspond to an integer equal to or greater than 1.

Preferably, a resource collided with the $k^{th}$ transmission unit resource of the transmission resource of the second UE can be dropped only among the second transmission resource.

Preferably, a resource collided with the transmission resource of the second UE can be dropped only among the second transmission resource.

Preferably, a resource collided with the $k^{th}$ transmission unit resource of the transmission resource of the second UE and all resources appearing after the resource collided with the $k^{th}$ transmission unit resource can be dropped among the second transmission resource.

Preferably, a value of the k is configured in advance or can be indicated via higher layer signaling.

Preferably, the hopping unit resource may correspond to a physical resource block pair.

Preferably, at least a part of the transmission of the second transmission resource can be dropped based on a priority of the second transmission resource and a priority of the transmission resource of the second UE.

To further achieve these and other advantages and in accordance with the purpose of the present invention, according to a different embodiment, a user equipment (UE) performing hopping in a V2X (vehicle-to-something) communication includes a transceiver and a processor configured to control the transceiver, the processor configured to transmit a first message using a first transmission resource, the processor configured to determine a second transmission resource for transmitting a second message by hopping a first hopping unit resource of the first transmission resource according to a predetermined hopping rule, the processor, if the second transmission resource is collided with a $k^{th}$ hopping unit resource of a transmission resource of a second UE, configured to drop at least a part of transmission of the second transmission resource. In this case, the second transmission resource includes the hopped first hopping unit resource and at least one hopping unit resource contiguous to the hopped first hopping unit resource on a time axis and the k may correspond to an integer equal to or greater than 1.

Advantageous Effects

According to embodiments of the present invention, it is able to enhance a frequency offset compensation method and channel estimation performance in a V2X communication.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Mode for Invention

Figure 1:
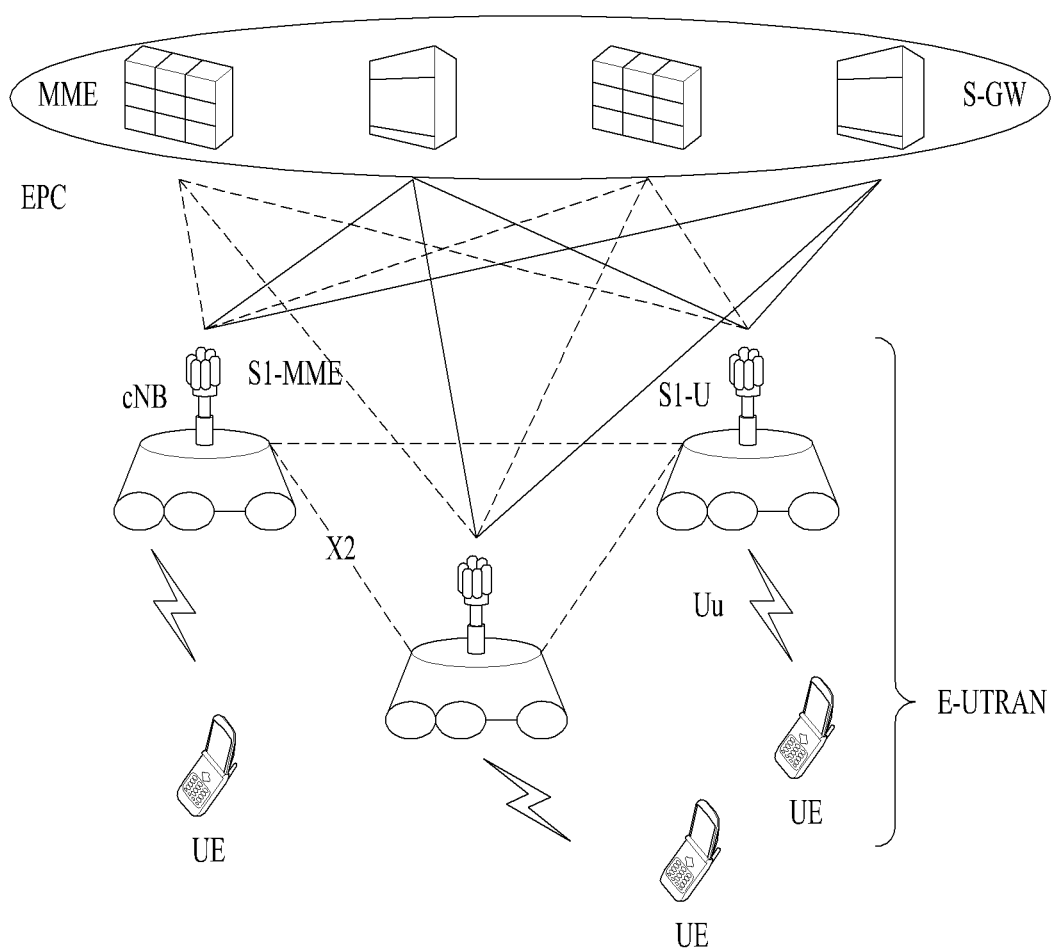
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described, focusing on a data transmission and reception relationship between vehicles. In the following description, a vehicle means the vehicle which a terminal is mounted on, and it may be called a terminal. In addition, a road side unit may mean an infrastructure capable of connecting to a base station, relay or network. In this case, the base station may serve as a terminal node of the network over which the base station directly communicates with the terminal. Moreover, specific operations illustrated as being conducted by the base station may also be conducted by an upper node of the base station. Further, a pedestrian may mean the person moving on bicycle or the person carrying a terminal.

It will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE system architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
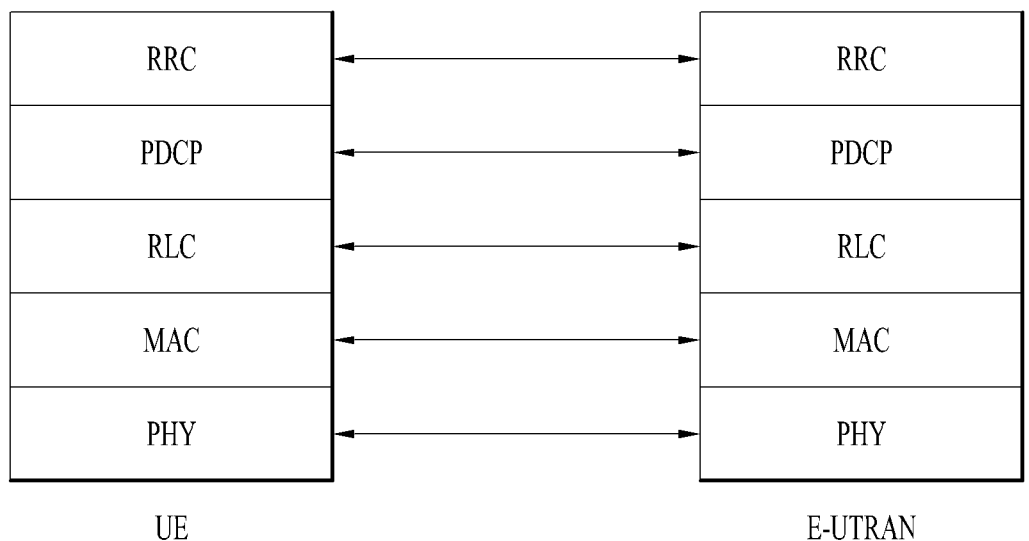
FIG. 2 illustrates a control plane of a radio protocol.
Figure 3:
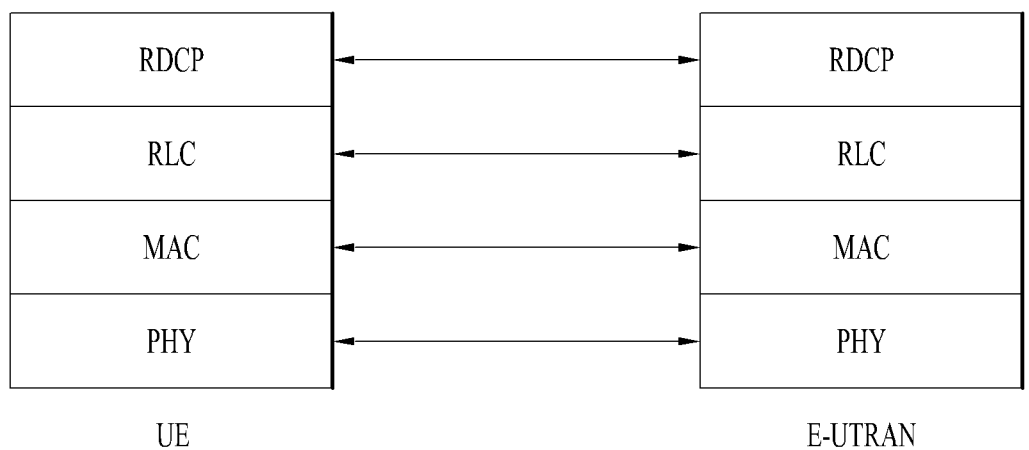
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A resource structure/channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
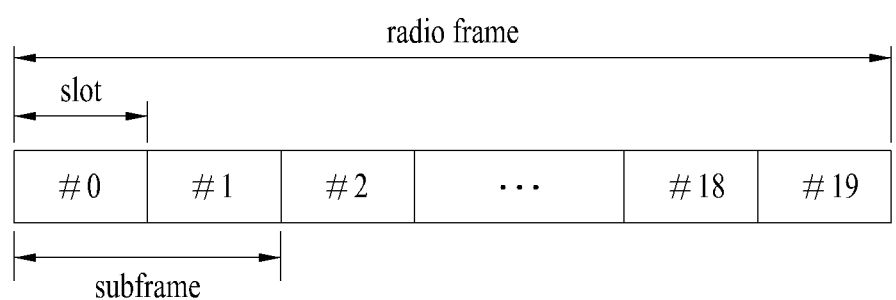
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
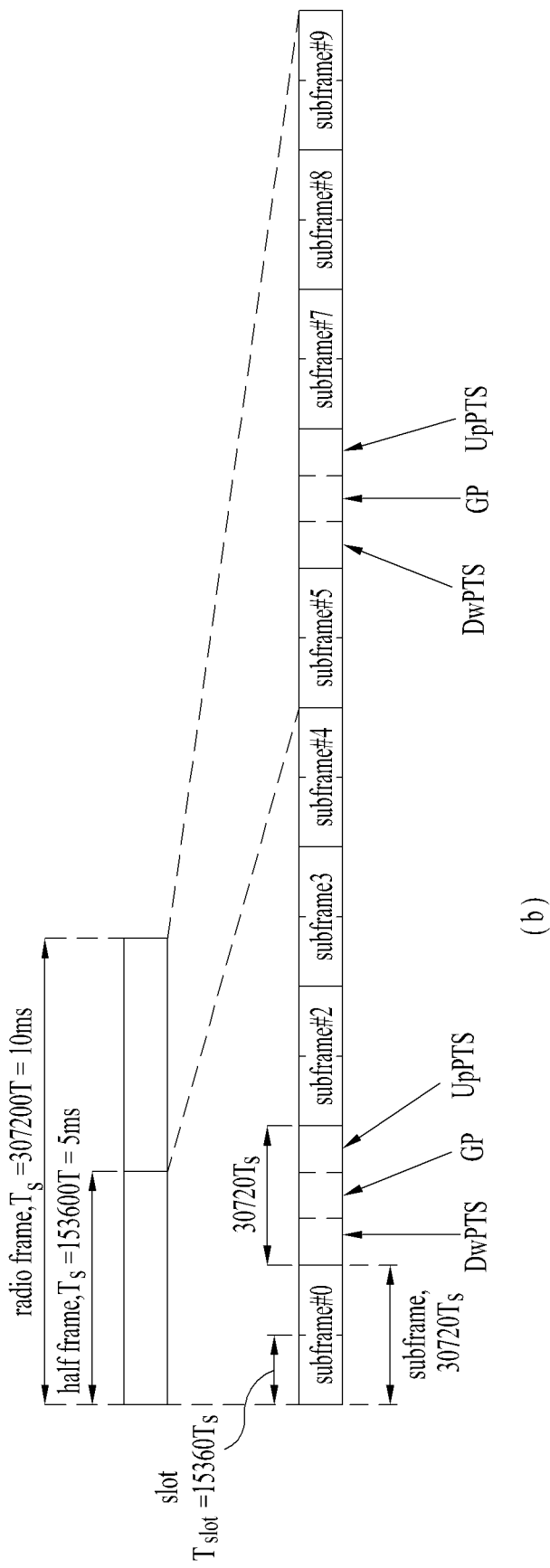
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
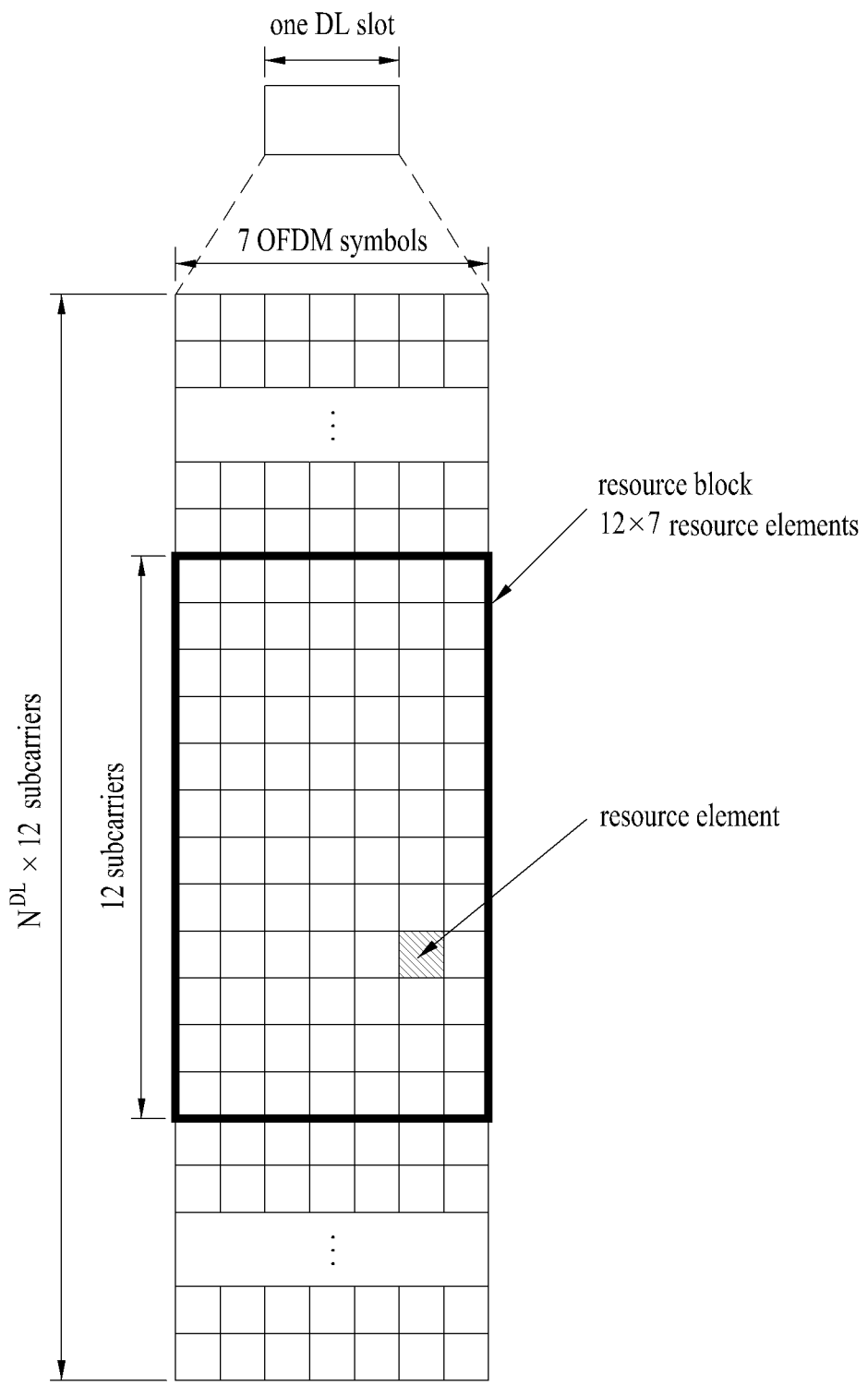
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
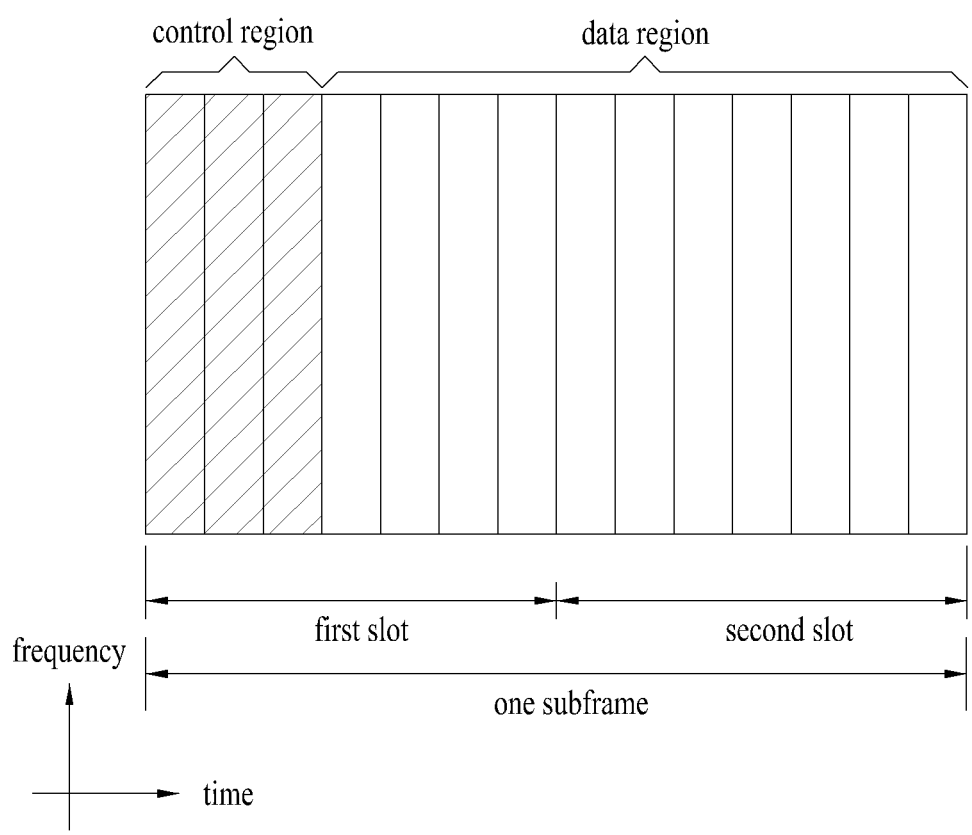
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
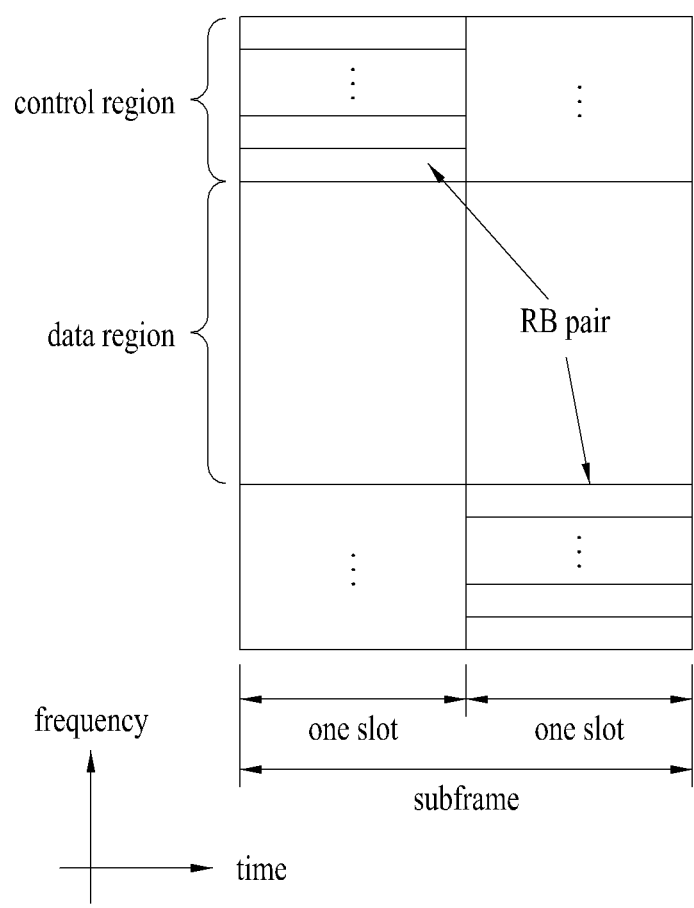
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

In the following, various embodiments for a UE to perform device to device communication (hereinafter, D2D communication, D2D direct communication, etc.) are explained. In explaining the D2D communication, 3GPP LTE/LTE-A is mainly explained as an example. Yet, the D2D communication can also be applied to a different communication system (e.g., IEEE 802.16, WiMAX, etc.).

D2D Communication type

D2D communication can be classified into a network coordinated D2D communication type and an autonomous D2D communication type according to whether a D2D communication is performed by a control of a network. The network coordinated D2D communication type can be classified again into a type of transmitting data only by D2D (data only in D2D) and a type of performing an access control only by a network (connection control only in network) according to the extent of involvement of the network. For clarity, the type of transmitting data only by the D2D is called a 'network concentrated D2D communication type' and the type of performing access control only by the network is called a 'distributed D2D communication type' in the following.

According to the network concentrated D2D communication type, data is exchanged between D2D terminals only. An access control (connection control) and radio resource allocation (grant message) between the D2D terminals are performed by a network. The D2D terminals can transmit and receive data or specific control information using a radio resource allocated by the network. For instance, HARQ ACK/NACK feedback for the data reception between the D2D terminals or channel state information (CSI) is not directly exchanged between the D2D terminals. Instead, the feedback or the CSI can be transmitted to a different D2D terminal via the network. Specifically, when the network establishes a D2D link between the D2D terminals and allocates a radio resource to the established D2D link, a transmission D2D terminal and a reception D2D terminal can perform D2D communication using the allocated radio resource. In particular, according to the network concentrated D2D communication type, D2D communication between D2D terminals is controlled by the network and the D2D terminals can perform D2D communication using a radio resource allocated by the network.

A network according to the distributed D2D communication type performs a more limitative role compared to a network according to the network concentrated D2D communication type. Although the network in the distributed D2D communication type performs an access control between D2D terminals, radio resource allocation (grant message) between the D2D terminals can be autonomously occupied by the D2D terminals via contention without a help of the network. For instance, HARQ ACK/NACK feedback for the reception of data between the D2D terminals or channel state information can be directly exchanged between the D2D terminals without passing through the network.

As mentioned earlier in the foregoing example, D2D communication can be classified into the network concentrated D2D communication type and the distributed D2D communication type according to the extent of involvement of a network. In this case, a common characteristic between the network concentrated D2D communication type and the distributed D2D communication type is a D2D access control capable of being performed by the network.

Specifically, a network according to the network coordinated D2D communication type can establish a connection between D2D terminals in a manner of establishing a D2D link between the D2D terminals intending to perform D2D communication. In case of establishing the D2D link between the D2D terminals, the network can assign a physical D2D link identifier (LID) to the established D2D link. The physical D2D link ID can be used as an identifier for identifying each of a plurality of D2D links in case that there are a plurality of the D2D links among a plurality of D2D terminals.

Unlike the network concentrated type and the distributed D2D communication type, according to an autonomous D2D communication type, D2D terminals can freely perform D2D communication without a help of a network. In particular, unlike the network concentrated type and the distributed D2D communication type, an access control, occupation of a radio resource and the like can be autonomously performed by the D2D terminals in the autonomous D2D communication type. If necessary, the network may provide the D2D terminals with D2D channel information capable of being used in a corresponding cell.

Configuration of D2D communication link

For clarity, a terminal performing or capable of performing the D2D communication, which is a direct communication between terminals, is called a D2D terminal (D2D terminal). In the following description, a 'UE' may correspond to a D2D terminal. When it is necessary to distinguish a transmitting end from a receiving end, in case of performing the D2D communication, a D2D terminal transmitting or intending to transmit data to a different D2D terminal using a radio resource given to a D2D link is called a transmission D2D terminal. On the contrary, a terminal receiving or intending to receive data from the transmission D2D terminal is called a reception D2D terminal. If there exist a plurality of reception D2D terminals, which receive or intend to receive data from the transmission D2D terminal, a plurality of the reception D2D terminals can be distinguished from each other using a prefix such as 'first to N'. Moreover, for clarity, such a random node of a network as a base station configured to perform access control between D2D terminals or allocate a radio resource to a D2D link, a D2D server, an access/session management server and the like are commonly called a 'network' in the following description.

In order for a D2D terminal performing D2D communication to transmit data to a different D2D terminal via the D2D communication, it is necessary for the D2D to check whether or not D2D terminals capable of transmitting and receiving data are located near the D2D terminal. To this end, the D2D terminal performs D2D peer discovery. The D2D terminal performs D2D discovery within a discovery interval and all D2D terminals may share the discovery interval. The D2D terminal monitors logical channels of a discovery region within the discovery interval to receive D2D discovery signals transmitted by different D2D terminals. Having received the signals of the different D2D terminals, the D2D terminal makes a list of adjacent D2D terminals using the received signal. And, the D2D terminal broadcasts information (i.e., an identifier) of the D2D terminal within the discovery interval and the different D2D terminals receive the broadcasted D2D discovery signal. By doing so, the different D2D terminals are able to know that the D2D terminal exists within a range capable of performing D2D communication.

Information broadcasting for D2D discovery can be periodically performed. And, broadcasting timing can be determined in advance by a protocol and can be notified to D2D terminals. The D2D terminal can transmit/broadcast a signal during a part of the discovery interval. Each of the D2D terminals may monitor signals potentially transmitted by different D2D terminals during the rest of the D2D discovery interval.

For example, a D2D discovery signal may correspond to a beacon signal. And, D2D discovery intervals may include a plurality of symbols (e.g., OFDM symbols). A D2D terminal selects at least one symbol belonging to a D2D discovery interval to transmit/broadcast a D2D discovery signal. And, the D2D terminal may transmit a signal corresponding to a tone of the symbol selected by the D2D terminal.

After D2D UEs discovers each other through a D2D discovery process, the D2D UEs perform a connection establishment process. By doing so, one D2D UE can transmit traffic to the other D2D UE.

Figure 9:
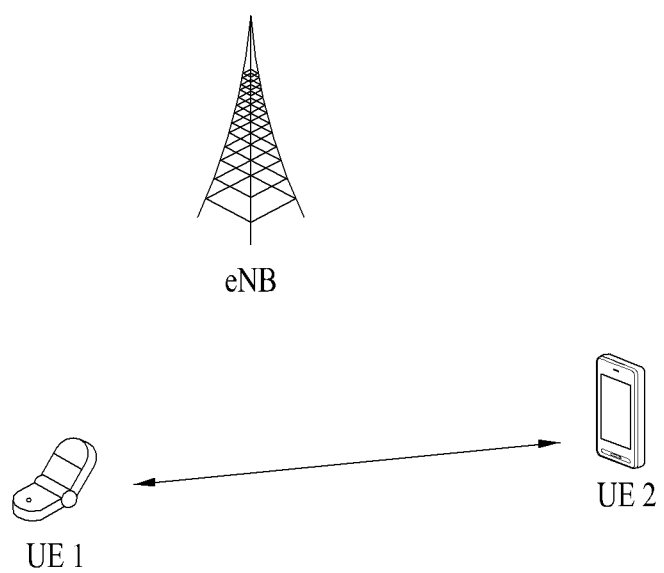
FIG. 9 is a diagram for a simplified D2D communication network.

FIG. 9 is a diagram for a simplified D2D communication network.

Referring to FIG. 9, D2D communication is performed between UEs (UE1 and UE2) supporting D2D communication. In general, a user equipment (UE) corresponds to a terminal of a user. If such a network device as an eNB (evolved Node B) transmits and receives a signal according to a communication scheme between the UEs UE1 and UE2), the eNB can be considered as a UE as well.

A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 10:
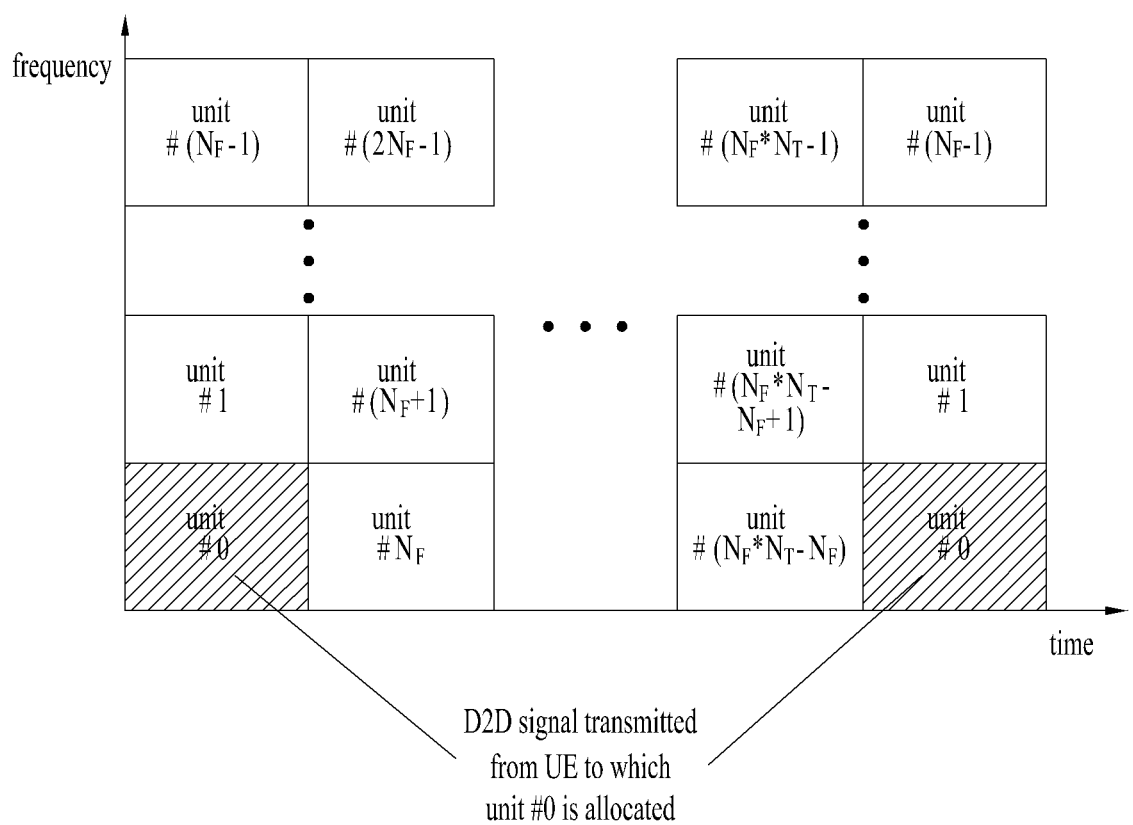
FIG. 10 is a diagram for a configuration of a resource unit according to an example.

FIG. 10 is a diagram for a configuration of a resource unit according to an example.

In FIG. 10, a vertical axis corresponds to a frequency resource and a horizontal axis corresponds to a time resource. A radio resource is divided into the $N_T$ number of resource units in a time axis to configure the $N_T$ number of subframes. And, a frequency resource is divided into the $N_F$ number of resource units in a subframe. In particular, one subframe can include the $N_T$ number of symbols. In particular, it is able to define $N_F * N_T$ number of resource units in total.

A D2D transmission resource (unit #0) allocated to a unit number 0 is repeated in every $N_T$ number of subframes. In embodiment of FIG. 10, a resource pool can be repeated with a period of the $N_T$ number of subframes. As shown in FIG. 10, a specific resource unit may periodically and repeatedly appear. Or, an index of a physical resource unit to which a logical resource unit is mapped may change according to a predetermined pattern to obtain a diversity gain in time domain and/or frequency domain. For example, the logical resource unit can hop on time and/or frequency axis according to a predetermined pattern set to an actual physical resource unit. In FIG. 10, a resource pool may correspond to a set of resource units capable of being used by a UE intending to transmit a D2D signal.

The resource pool can be classified into various types. First of all, the resource pool can be classified according to contents of a D2D signal transmitted via each resource pool. For example, the contents of the D2D signal can be classified into various signals and a separate resource pool can be configured according to each of the contents.

Scheduling assignment (SA): The SA may correspond to a signal including information on a resource position of a D2D data channel, information on MCS (modulation and coding scheme) necessary for modulating and demodulating a data channel, information on a MIMO transmission scheme, and the like. SA information may include an identifier of a target UE to which data of each transmission UE is to be transmitted. A signal including the SA information can be transmitted on an identical resource unit in a manner of being multiplexed with D2D data. In this case, an SA resource pool may correspond to a pool of resources that SA and D2D data are transmitted in a manner of being multiplexed.

D2D data channel: The D2D data channel corresponds to a resource pool used by a transmission UE to transmit user data using a resource designated by the SA. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

Discovery message: A discovery message resource pool corresponds to a resource pool for transmitting a discovery message that enables neighboring UEs to discover a transmission UE transmitting information such as ID of the UE, and the like.

Synchronization signal/channel: A synchronization signal/channel can be referred to as a sidelink synchronization signal or a sidelink broadcast channel. The synchronization signal/channel corresponds to a resource pool used for a transmission UE to transmit information related to a synchronization signal and/or synchronization. A reception UE can acquire time and/or frequency synchronization with the transmission UE using the information related to a synchronization signal and/or synchronization.

The SA and the D2D channel may use a resource pool separated with each other in a subframe. However, if a UE is able to simultaneously transmit SA and D2D data in a single subframe, two types of resource pools can be configured at the same time in the same subframe.

As mentioned in the foregoing description, a D2D resource pool can also be classified according to content of a D2D signal. Yet, although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), and the like.

According to the aforementioned contents, a UE intending to transmit data via D2D selects an appropriate resource from an SA pool and transmits SA of the transmission UE. In this case, as a reference for selecting an SA resource pool, it may be able to preferentially select an SA resource interlocked with a resource that satisfies at least one of a resource not transmitting SA of a different UE and a resource which is expected not to transmit data in a following subframe according to SA of a different UE. In addition, the transmission UE may select an SA resource interlocked with a data transmission resource of which an interference level is expected to be low. And, the SA information can be broadcasted. In doing so, UEs belonging to a D2D communication system may receive the broadcasted SA information. In the following, 'transmitting' or 'sending' can be replaced with 'broadcasting'.

In the aforementioned D2D communication, the term 'D2D' can be replaced by 'sidelink'.

Figure 11:
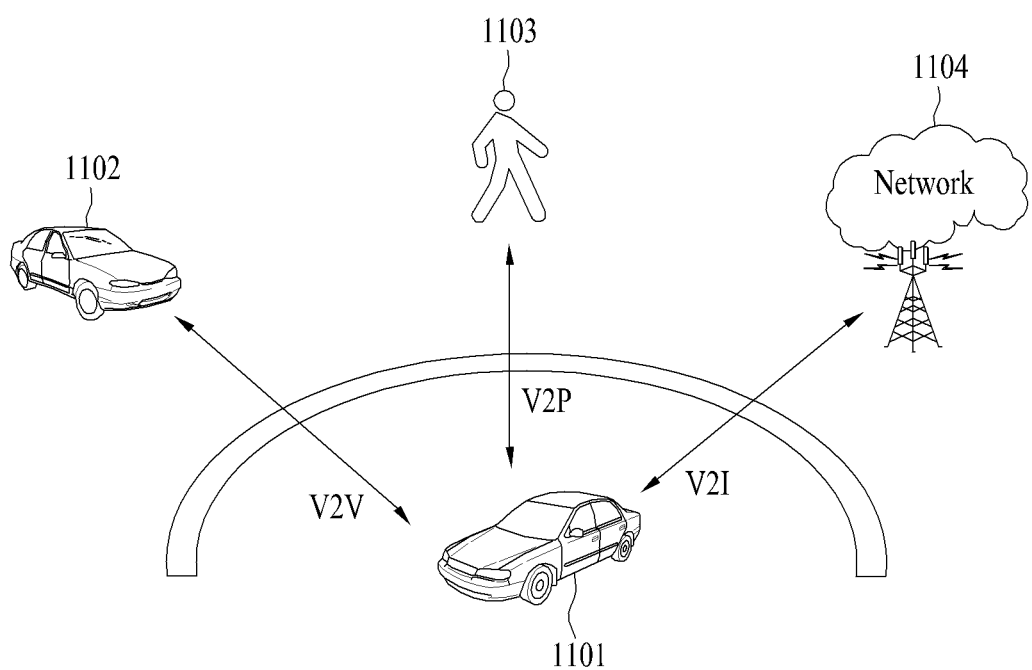
FIG. 11 is a schematic diagram showing a V2X communication network.

FIG. 11 is a schematic diagram showing a V2X communication network.

V2X communication may be categorized into V2V (vehicle-to-vehicle) communication, V2P (vehicle-to-pedestrian) communication, and V2I (vehicle-to-infrastructure entity) communication. V2V communication may refer to communication between vehicles 1101 and 1102. Traffic information and the like may be shared between the vehicles 1101 and 1102 through V2V communication. V2P communication may refer to communication between the vehicle 1101 and a device (e.g., a handheld terminal of a pedestrian or a bicycle rider) carried by a pedestrian 1103. Since the pedestrian 1103 can move along a sidewalk adjacent to a road as well, information on a danger on the road and the like may be shared through V2P communication. And, V2I communication may refer to communication between the vehicle and a roadside unit (RSU) 1104. The RSU 1104 may refer to a traffic infrastructure entity. For example, the RSU 1104 may include an entity that transmits a speed notification. For V2X communication, the vehicles 1101 and 1102, the RSU 1004 and the handheld device of the pedestrian 1103 may be equipped with transceivers. V2X communication may be implemented using a technology similar to D2D (device-to-device) communication of the communication standard of the 3GPP ($3^{rd}$ generation partnership project). And, V2X communication may be implemented using DSRC (dedicated short-range communication) technology of IEEE (institute of electrical and electronics engineers).

Hereinafter, a description will be given of a method for transmitting an alarm message in V2X communication according to an embodiment of the present invention. Although the present invention will be described, focusing on V2V communication, the following embodiments can be applied to V2I and/or V2P communication as well. In addition, although the embodiments will be explained with reference to 3GPP communication standards, they can be implemented based on the technologies associated with IEEE communication standards. Moreover, in this specification, the term "transmission" can be interchangeably used with the term "broadcasting". Further, a vehicle or pedestrian may mean a vehicle or pedestrian carrying a user equipment (UE), or it may directly indicate the UE.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 12:
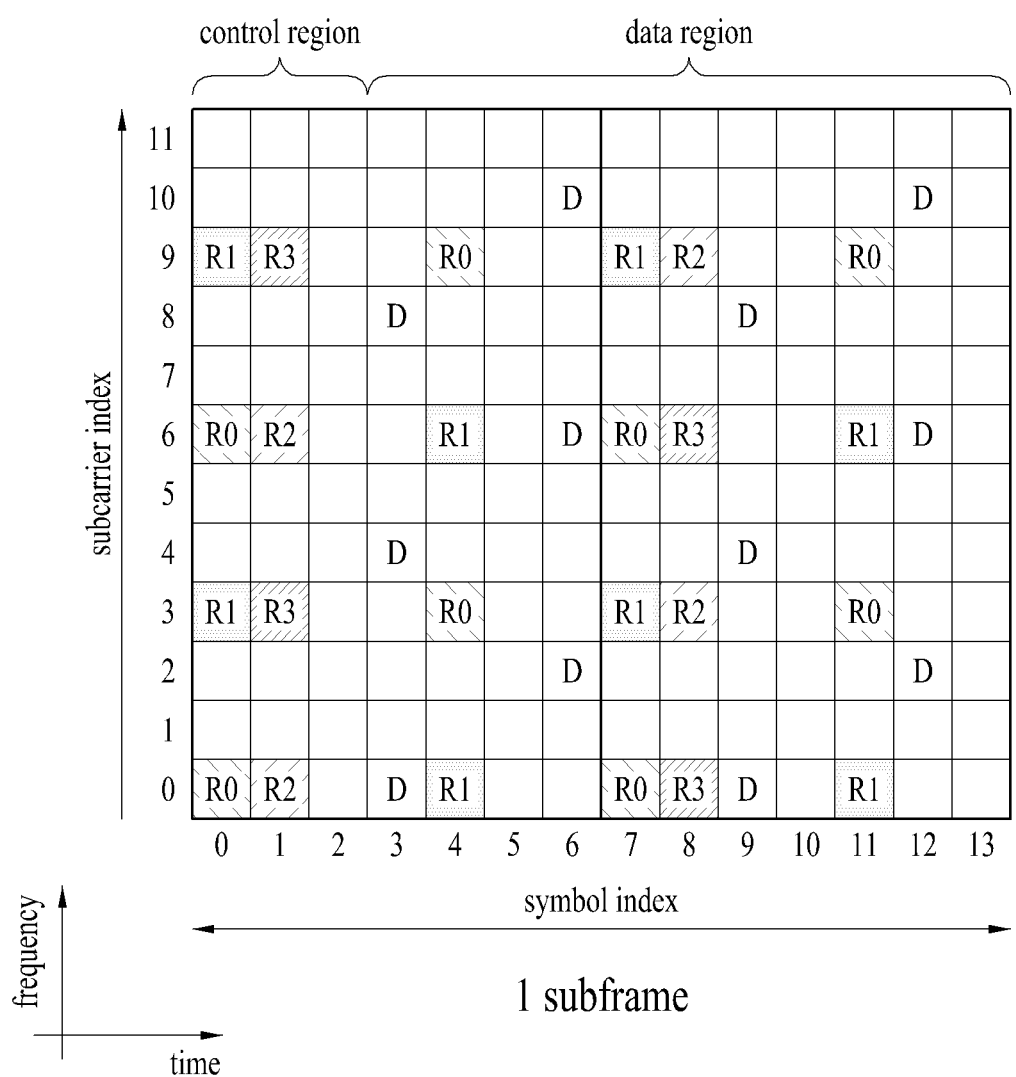
FIG. 12 is a diagram illustrating legacy CRS and DRS patterns.

FIG. 12 illustrates a CRS and DRS pattern for an RB (including 14 OFDM symbols in time by 12 subcarriers in frequency in case of a normal CP) in a system where an eNB has four Tx antennas. In FIG. 12, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 13:
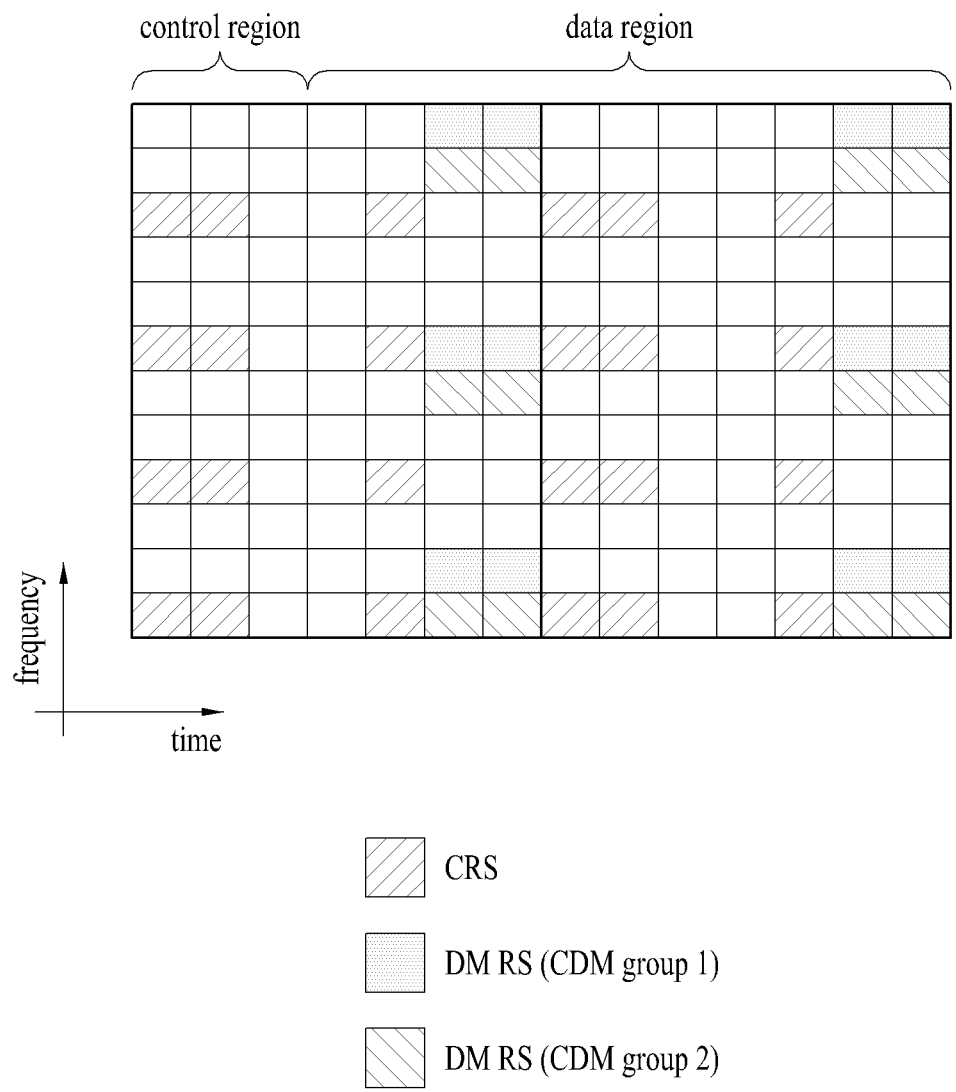
FIG. 13 is a diagram illustrating an example of a DM RS pattern.

FIG. 13 illustrates an exemplary DM RS pattern defined for the LTE-A system. In FIG. 13, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 13, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 14:
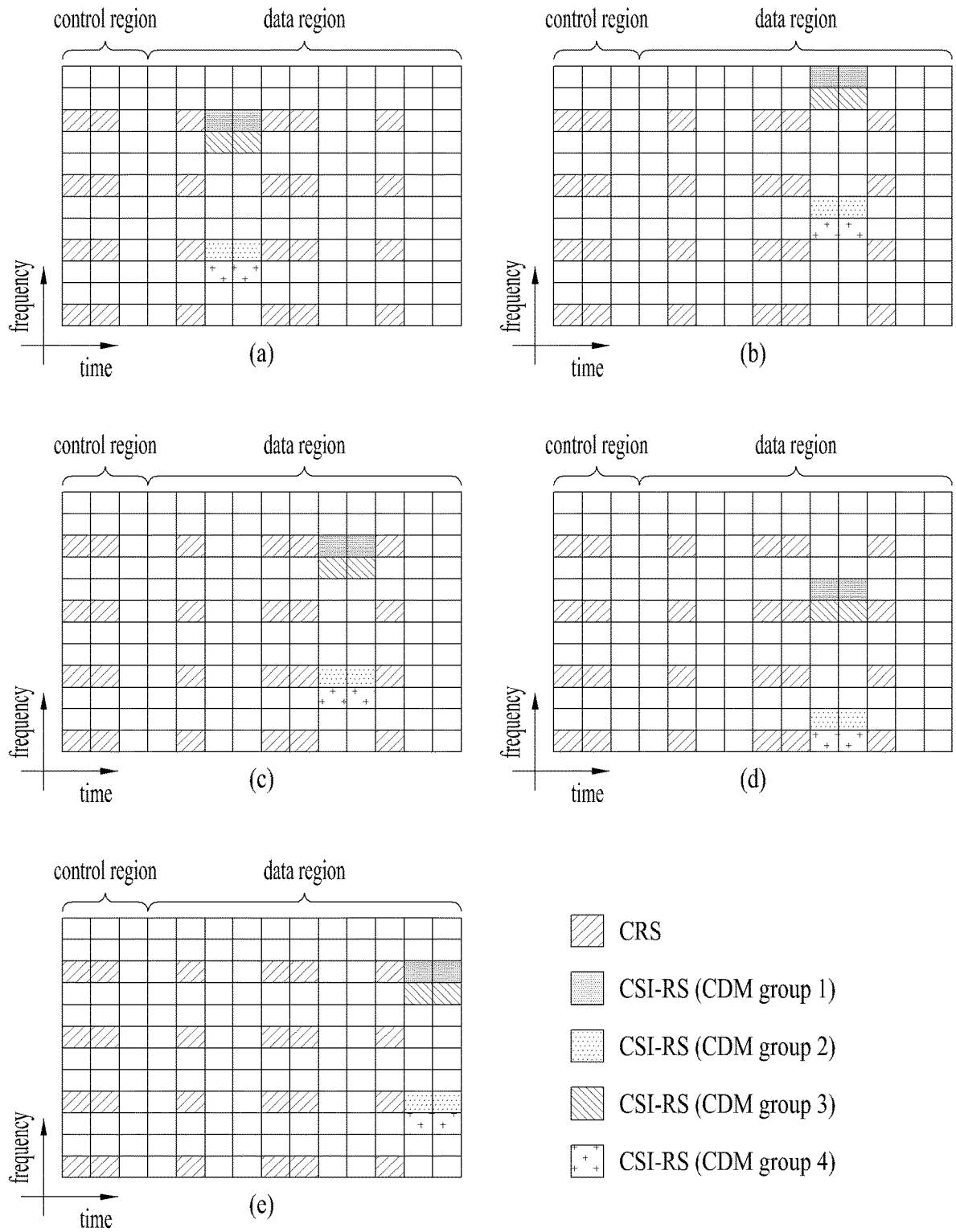
FIG. 14 is a diagram illustrating examples of a CSI-RS pattern.

FIG. 14 illustrates exemplary CSI-RS patterns defined for the LTE-A system. In FIG. 14, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 14(a) to 14(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 14(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 14(a) is applicable to the CSI-RS patterns illustrated in FIGS. 14(b) to 14(e).

RS patterns shown in FIGS. 12 to 14 are disclosed only for illustrative purposes, and the scope or spirit of the present invention are not limited only to a specific RS pattern. That is, even in the case in which RS patterns different from those of FIGS. 12 to 14 are defined and used, various embodiments of the present invention can also be equally applied thereto without difficulty.

PUSCH frequency hopping

In the following, PUSCH (physical uplink shared channel) frequency hopping currently used in uplink of LTE communication system is explained.

PUSCH hopping used in LTE/LTE-A system can be classified into type-1 PUSCH hopping and type-2 PUSCH hopping. The type-1 PUSCH hopping can be determined by one selected from the group consisting of ¼, –¼, and ½ hopping of a hopping bandwidth according to a hopping bit indicated by uplink grant DCI (downlink control information). Specifically, a lowest PRB (physical resource block) index of a first slot of a subframe i for PUSCH RA (resource allocation) corresponds to $n_{PRB}^{S1}(i)=RB_{START}$ and $RB_{START}$ can be obtained from an uplink grant. If the lowest PRB index of the first slot is determined, it is able to determine a position of a lowest PRB index $n_{PRB}(i)$ of a second slot of the subframe i according to an equation 1 and table 1 described in the following.

$$\begin{cases} n_{PRB}^{s1}(i) = \tilde{n}_{PRB}^{S1}(i) + \tilde{N}_{RB}^{HO}/2 \\ n_{PRB}(i) = \tilde{n}_{PRB}(i) + \tilde{N}_{RB}^{HO}/2 \end{cases}$$ [Equation 1]

TABLE 1

| System BW $N_{RB}^{UL}$ | Number of Hopping bits | Information in hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
| | | 1 | Type 2 PUSCH Hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
| | | 01 | $(-\lfloor N_{RB}^{PUSCH}/4 \rfloor + \tilde{n}_{PRB}^{S1}(i)) \bmod N_{RB}^{PUSCH}$ |
| | | 10 | $(\lfloor N_{RB}^{PUSCH}/2 \rfloor + \tilde{n}_{PRB}^{S1}(i)) \bmod N_{RB}^{PUSCH}$ |
| | | 11 | Type 2 PUSCH Hopping |

In Equation 1, $N_{RB}^{HO}$ corresponds to a PUSCH hopping offset (pusch-HoppingOffset) and is provided by a higher layer. If the $N_{RB}^{HO}$ corresponds to an odd number, it may be able to represent it as $\tilde{N}_{RB}^{HO}=N_{RB}^{HO}+$. If the $N_{RB}^{HO}$ corresponds to an even number, it may be able to represent it as $\tilde{N}_{RB}^{HO}=N_{RB}^{HO}$. In Table 1, $N_{RB}^{PUSCH}$ corresponds to the number of PUSCH resource blocks and may indicate a frequency hopping bandwidth.

Figure 15:
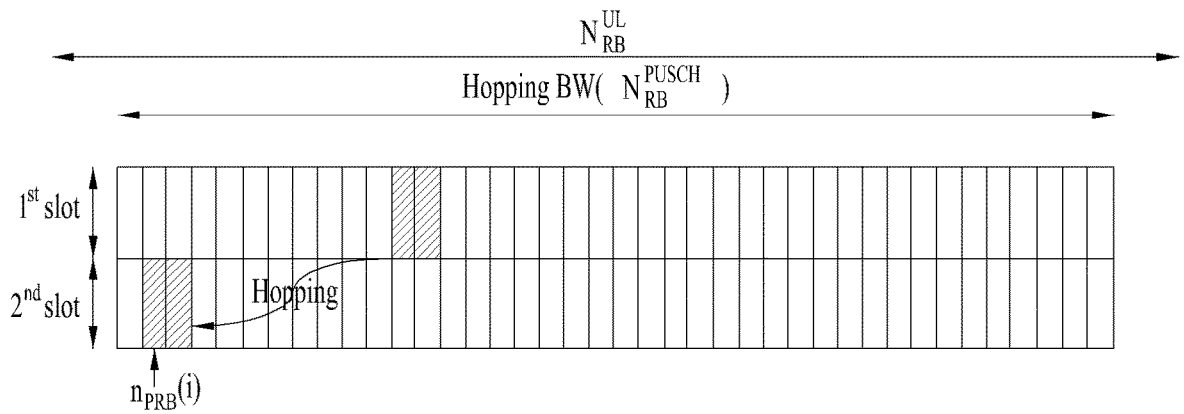
FIG. 15 illustrates an example of type-1 PUSCH hopping.

FIG. 15 illustrates an example of type-1 PUSCH hopping.

In FIG. 15, a hopping bit has a value of 01. Hence, $\tilde{n}_{PRB}(i)$ can be represented as $(-\lfloor N_{RB}^{PUSCH}/4 \rfloor + \tilde{n}_{PRB}^{S1}(i)) \bmod N_{RB}^{PUSCH}$. A PRB index $n_{PRB}(i)$ of a second slot, which has hopped as much as –¼ hopping bandwidth ($N_{RB}^{PUSCH}$) from a lowest index of a first slot, can be calculated with reference to the equation 1.

A type-2 PUSCH hopping can be performed based on a subband. The type-2 PUSCH hopping can be determined by an equation 2 in the following. A PRB index of a slot $n_S$ can be calculated by the equation 2.

$$\tilde{n}_{PRB}(n_s) = \qquad \text{[Equation 2]}$$

$$\frac{(\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i))}{\bmod(N_{SB}^{sb} \cdot N_{sb})}$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) - \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

In Equation 2, $N_{sb}$ corresponds to the number of subbands provided via higher layer signaling and $n_{VRB}$ can be obtained from a scheduling grant. $N_{RB}^{HO}$ corresponds to a PUSCH hopping offset (pusch-HoppingOffset) provided from a higher layer.

Meanwhile, $N_{sb}$ corresponds to the number of subbands signaled via higher layer and the number of resource blocks $N_{RB}^{sb}$ of each subband can be calculated by equation 3 in the following.

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases} \quad \text{[Equation 3]}$$

$N_{RB}^{UL}$ corresponds to the number of uplink resource blocks.

And, a hopping function $f_{hop}(i)$ can be represented as equation 4 in the following.

[Equation 4]

$$f_{hop}(i) = \begin{cases} 0 & N_{sb} = 1 \\ \left( f_{hop}(i-1) + \sum_{k=i\cdot 10+1}^{i\cdot 10+9} c(k) \times 2^{k-(i\cdot 10+1)} \right) \bmod N_{sb} & N_{sb} = 2 \\ \left( f_{hop}(i-1) + \left( \sum_{k=i\cdot 10+1}^{i\cdot 10+9} c(k) \times 2^{k-(i\cdot 10+1)} \right) \bmod (N_{sb}-1) + 1 \right) \bmod N_{sb} & N_{sb} > 2 \end{cases}$$

And, a mirroring function $f_m(i)$ can be represented as equation 5 in the following.

[Equation 5]

$$f_m(i) = \begin{cases} i \bmod 2 & N_{sb} = 1 \text{ and intra and inter-subframe hopping} \\ \text{CURRENT\_TX\_NB} \bmod 2 & N_{sb} = 1 \text{ and inter-subframe hopping} \\ c(i \cdot 10) & N_{sb} > 1 \end{cases}$$

In Equation 5, CURRENT_TX_NB denotes a transmission count of a transport block. c(i) corresponds to a pseudo-random sequence. In case of using a frame structure type 1, the c(i) is initialized to $c_{init} = N_{ID}^{cell}$. In case of using a frame structure type 2, the c(i) is initialized to $c_{init} = 2^9 \cdot (n_I \bmod 4) + N_{ID}^{cell}$ at the beginning of each frame. For the c(i), it may refer to the paragraph 7.2 of 3GPP TS 36.211 document.

The type-2 PUSCH hopping performs mirroring while hopping is performed in a unit of a subband using the hopping function $f_{hop}(i)$. The mirroring is applied in a manner of reversing an order of using resources in a subband. As described in equation 4, the hopping function can be determined based on a pseudo-random sequence c(k). In this case, the pseudo-random sequence c(k) corresponds to a function of a cell ID and a mirroring pattern also corresponds to a function of a cell ID. Hence, all UEs belonging to the same cell have the same hopping pattern. In particular, cell-specific mirroring can be applied to the type-2 PUSCH hopping.

Figure 16:
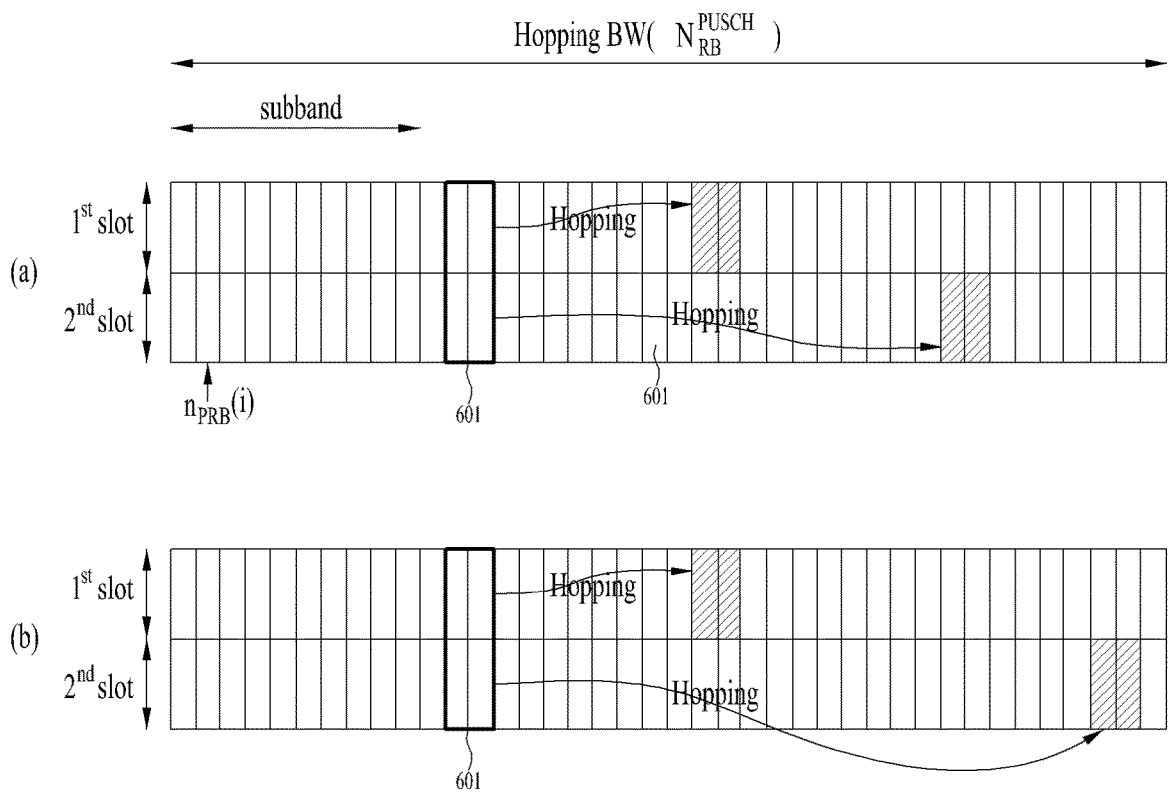
FIG. 16 illustrates an example of type-2 PUSCH hopping.

FIG. 16 illustrates an example of type-2 PUSCH hopping.

FIG. 16 illustrates type-2 PUSCH hopping when the number of subbands $N_{sb}$ corresponds to 4. Referring to FIG. 16 (a), hopping is performed as much as one subband in a first slot and hopping is performed as much as two subbands in a second slot on the basis of a virtual resource block 601. Referring to FIG. 16 (b), mirroring is applied to a second slot.

In case of performing V2X (vehicle-to-something) communication, as mentioned earlier with reference to D2D communication, it may use a control channel and a data channel. And, as mentioned earlier with reference to D2D communication, a resource pool for a control channel and a resource pool for a data channel can be configured, respectively, in the V2X communication. And, the control channel can be associated with one or a plurality of data channels. For example, the control channel may include information for receiving one or a plurality of data channels.

In V2X communication, a plurality of vehicles can transmit a periodic message. In the following description, a UE may correspond to a vehicle or a terminal positioned within the vehicle. A control channel or a data channel for transmitting a periodic message of a transmission UE can be overlapped with a transmission of a different transmission UE on a time axis. And, due to periodic transmission of a different transmission UE, the control channel or the data channel transmitted by the transmission UE can be periodically collided with the transmission of the different UE. In this case, the transmission UE may fail to receive the periodic transmission of the different transmission UE. For example, the transmission UE may correspond to a half-duplex UE which is unable to perform reception at the time of performing transmission. In particular, the transmission UE may fail to receive the transmission of the different UE due to the half-duplex problem.

For example, a control channel and a data channel associated with the control channel can be configured in every period. The control channel and the data channel may perform hopping on a time axis and/or a frequency axis within a period in consideration of the aforementioned half-duplex problem. If the control channel and/or the data channel perform hopping on the time axis, although messages having the same interval are transmitted, the half-duplex problem can be reduced.

Yet, in case of performing V2X communication, a size of a periodically transmitted message can be periodically changed or a size of a transmitted message may vary depending on a UE. Hence, although hopping is performed on the time axis, a collision may occur between the data channel and the control channel.

Hence, in the following embodiments, a data channel and/or a control channel can perform hopping on a time axis or time and frequency axis in every period. In order to perform hopping, assume that a message transmitted by each UE has a resource block size of a predetermined size. For example, NF corresponds to a resource size on a frequency axis and NT may correspond to a resource size on a time axis, respectively. For example, NF=1 may correspond to a size of a resource block in frequency domain. In particular, NF=1 may correspond to a frequency band of 12 subcarriers. And, for example, NT=1 may correspond to a slot of a subframe on a time axis. In the following embodiment, assume that a unit resource block has a frequency size of NF and a time size of NT.

And, for example, assume that transmission of a message uses the N number of unit resource blocks. And, a unit of a transmission resource for performing hopping can be defined by the N number of unit resource blocks. And, the unit of the transmission resource for performing hopping can be configured to be smaller than a unit of a minimum resource of a transmission message. For example, if the N corresponds to 2, one resource block pair can be used as the unit of the transmission resource for performing hopping. In the following, the N number of unit resource blocks can be referred to as a hopping unit resource.

The values of the NF, the NT, and the N may correspond to a fixed value between a transmission UE and a reception UE. And, the values of the NF, the NT, and the N can be semi-statically configured via higher layer signaling (e.g., RRC signaling). For example, when hopping is performed on a data channel, the values of the NF, the NT, and the N can be designated via a control channel. In the following embodiments, a message may correspond to control information of a control channel and/or data of a data channel.

A resource consisting of the N number of unit resource blocks may perform hopping in every period. For example, a size of a message can be changed in every period. For example, a message of a size greater than a size of a message, which is transmitted in a previous period, can be transmitted in a next period. A resource for transmitting a message in a next period hops at a position of a previous period. And, an additional transmission resource, which is required in a next period due to the change of a message size, can be positioned in a manner of being contiguous to the hopped transmission resource. For example, the additional transmission resource and the hopped transmission resource can be continuously allocated on a time axis.

For example, a transmission resource in a previous period and a transmission resource in a next period can be referred to as a first transmission resource and a second transmission resource, respectively. In this case, the second transmission resource can be positioned at a location which is hopped according to a predetermined rule from the first transmission resource. And, if a message size changes, the second transmission resource can further include one or more hopping unit resources. For example, the second transmission resource performs hopping as much as a hopping unit resource from the first transmission resource and the remaining resources can be added to a hopped resource based on a predetermined rule. For example, as mentioned in the foregoing description, the remaining resources may correspond to resources contiguous to the hopped resource on a time axis.

A case of increasing a size of a transmission message compared to a previous period is explained in more detail. When a size of a transmission message increases, the size of the transmission message may exceed a hopping unit resource (i.e., N number of unit resource blocks). On the contrary, a size of a message transmitted in a previous period may have a size equal to or smaller than the hopping unit resource. In the next period, a hopping unit resource of the previous period can perform hopping according to a predetermined rule. And, in the next period, a hopping unit resource can be added due to the increase of a size of a transmission message. In this case, the added hopping unit resource can be determined based on a position of the hopped hopping unit resource.

And, a hopped transmission resource can be associated with a transmission resource of a previous period. For example, a hopping unit resource can be configured in a manner that NF corresponds to 1, NT corresponds to 1, and N corresponds to 2. In this case, the hopping unit resource may correspond to a physical resource block pair. For example, the hopped transmission resource can be allocated to a second subframe in a next period. In this case, at least a part of the remaining resources exceeding the hopping unit resource can be allocated to a first subframe contiguous to the hopped transmission resource. And, at least a part of the remaining resources can also be allocated to a third subframe contiguous to the hopped transmission resource.

For example, a hopping unit resource can be configured in a manner that NF corresponds to 1, NT corresponds to 1, and N corresponds to 2. And, for example, a resource exceeding the hopping unit resource can be configured to be allocated to a resource contiguous to the hopping unit resource after the hopping. And, for example, it may be necessary for a transmission resource to have 4 resource blocks. In this case, when 2 resource blocks corresponding to a hopping unit resource perform hopping, the remaining 2 resource blocks can be allocated in a manner of being contiguous to the hopped 2 resource blocks.

Hence, only a part corresponding to the hopping unit resource hops among resources of a transmission message in a next period and the remaining resources can be allocated to a resource associated with the hopped hopping unit resource.

Figure 17:
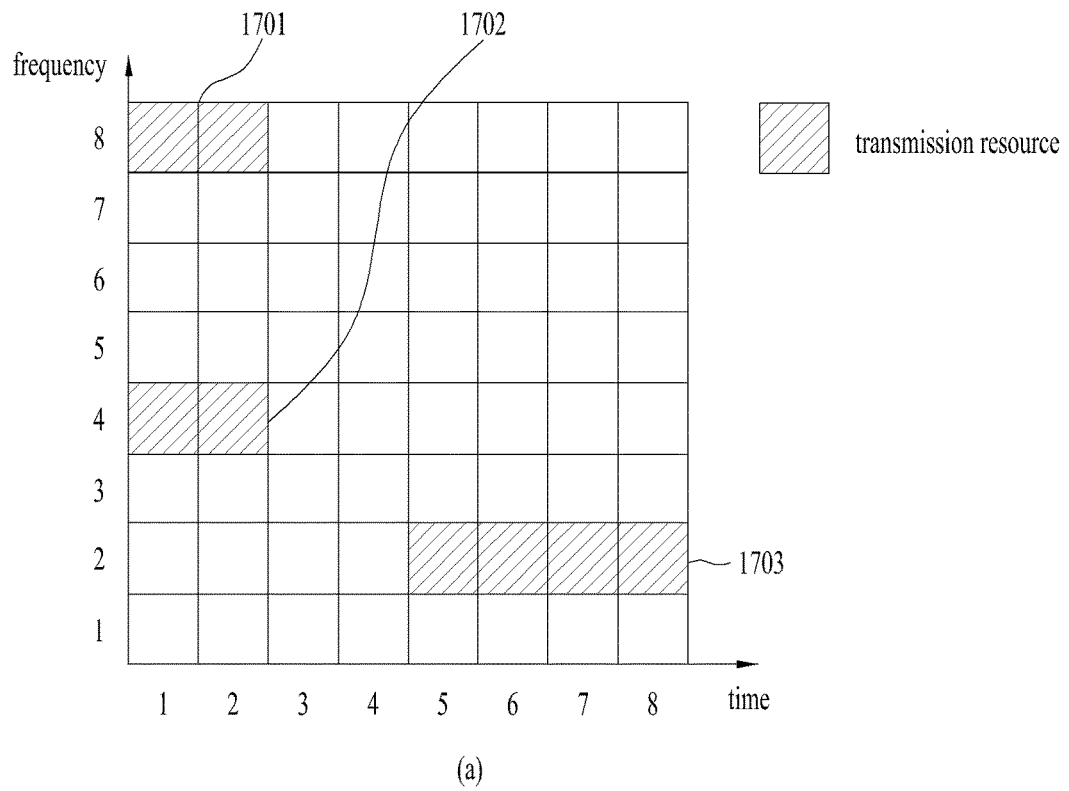
FIG. 17 is a diagram illustrating resource hopping according to one embodiment.
Figure 17:
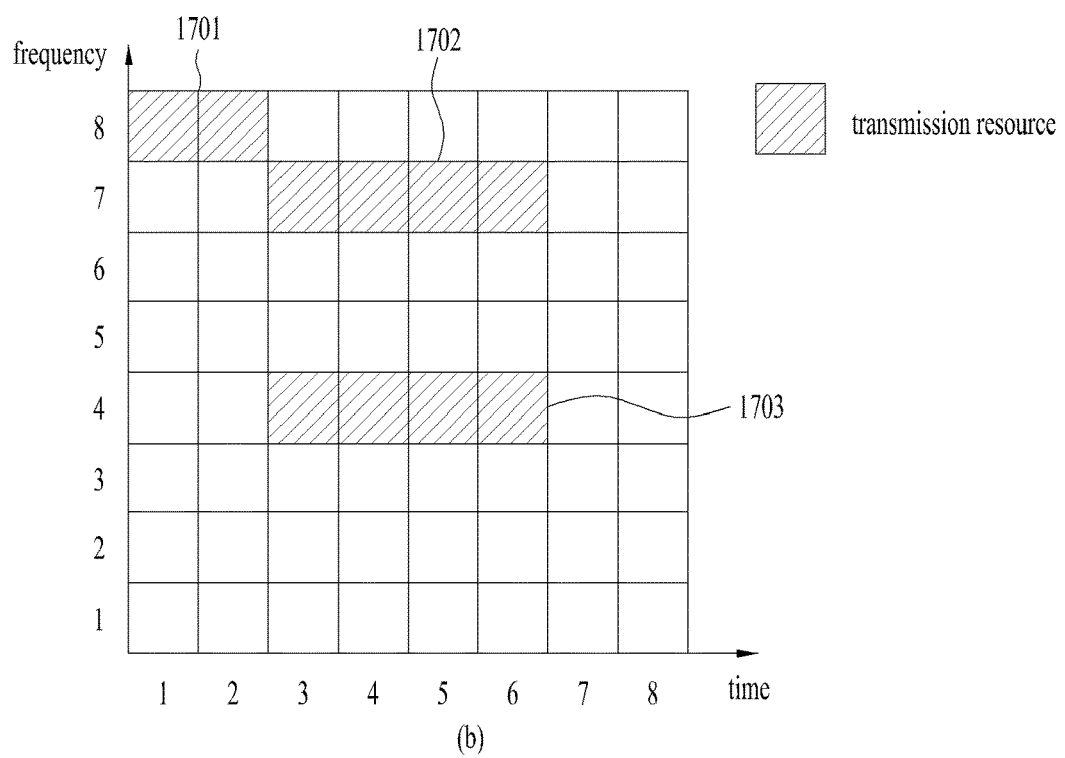

FIG. 17 is a diagram illustrating resource hopping according to one embodiment.

In an embodiment of FIG. 17, a hopping unit resource has values of NT=1, NF=1, and N=2. For example, NT=1 may correspond to a length of a subframe on a time axis. And, for example, NF=1 may correspond to a length of a subframe on a frequency axis. In particular, in the embodiment of FIG. 17, a hopping unit resource may correspond to a physical resource block pair.

In the embodiment of FIG. 17, (a) illustrates transmission resources allocated in a period i and (b) illustrates transmission resources allocated in a period i+1. A first transmission resource 1701 corresponds to a transmission resource used by a first UE, a second transmission resource 1702 corresponds to a transmission resource used by a second UE, and a third transmission resource 1703 corresponds to a transmission resource used by a third UE.

In (a) and (b) of FIG. 17, the first transmission resource 1701 does not perform hopping. Or, the first transmission resource 1701 shown in FIG. 17 (a) may hop to the same position.

Referring to FIG. 17 (a), the second transmission resource 1702 uses one hopping unit resource. Referring to FIG. 17 (b), the second transmission resource 1702 uses two hopping unit resources in a next period. For example, a hopping unit resource may hop to a $7^{th}$ frequency resource and $3^{rd}$ and $4^{th}$ time resources in a period i+1. And, an added hopping unit resource can be allocated to $5^{th}$ and $6^{th}$ time resources contiguous to the $3^{rd}$ and $4^{th}$ time resources on a time axis. In particular, as mentioned in the foregoing description, an added resource can be allocated to a resource associated with a hopped resource.

In FIGS. 17 (a) and (b), the third transmission resource 1703 uses two hopping unit resources. For example, a hopping unit resource may hop to a $4^{th}$ frequency resource and $3^{rd}$ and $4^{th}$ time resources in a period i+1. And, the remaining hopping unit resource can be allocated to $5^{th}$ and $6^{th}$ time resources contiguous to the $3^{rd}$ and $4^{th}$ time resources on a time axis. In particular, as mentioned in the foregoing description, a remaining resource can be allocated to a resource associated with a hopped resource.

In particular, hopping between periods is performed on a single hopping unit resource and a remaining or added hopping unit resource can be allocated to a resource associated with a hopped hopping unit resource.

When the aforementioned hopping method is performed, a collision may occur between hopped resources. For example, although a collision does not occur between resources in a certain period, if hopping is performed in a next period, an added resource or a remaining resource can be allocated to a resource associated with a hopped hopping unit resource. In particular, except the hopped hopping unit resource, the remaining resource or the added resource can be collided with a message transmitting resource of a different UE.

Figure 18:
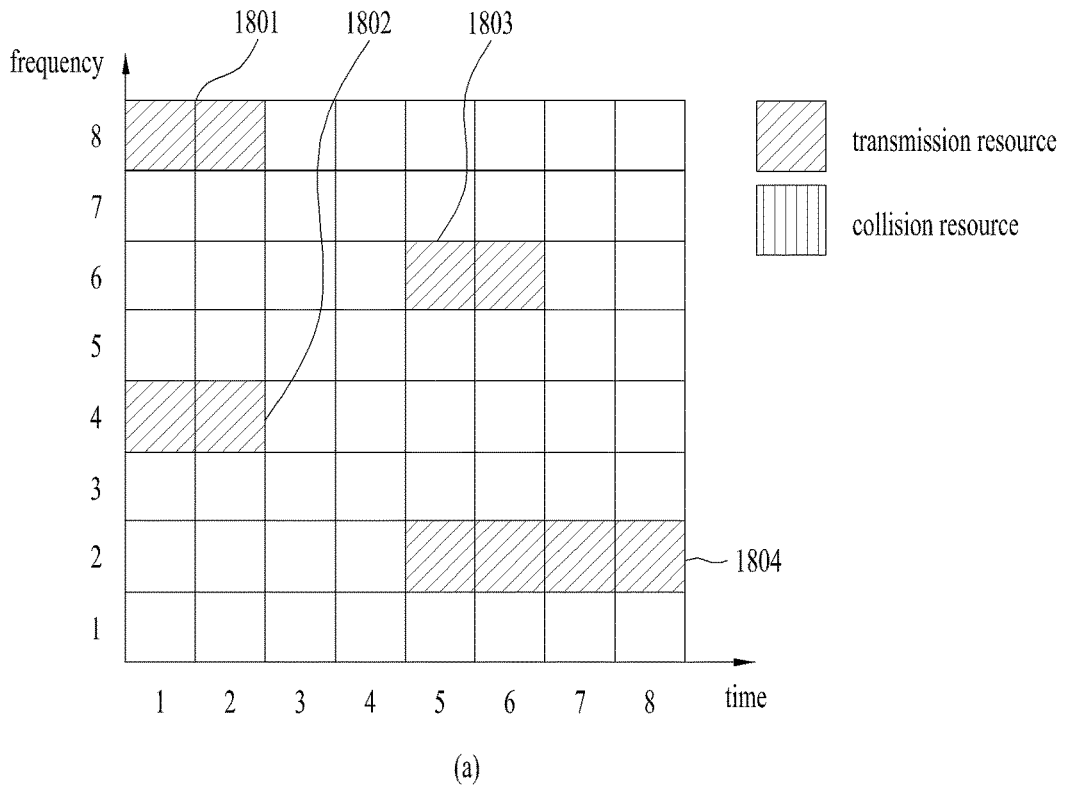
FIG. 18 is a diagram illustrating collision of a hopping resource according to one embodiment.
Figure 18:
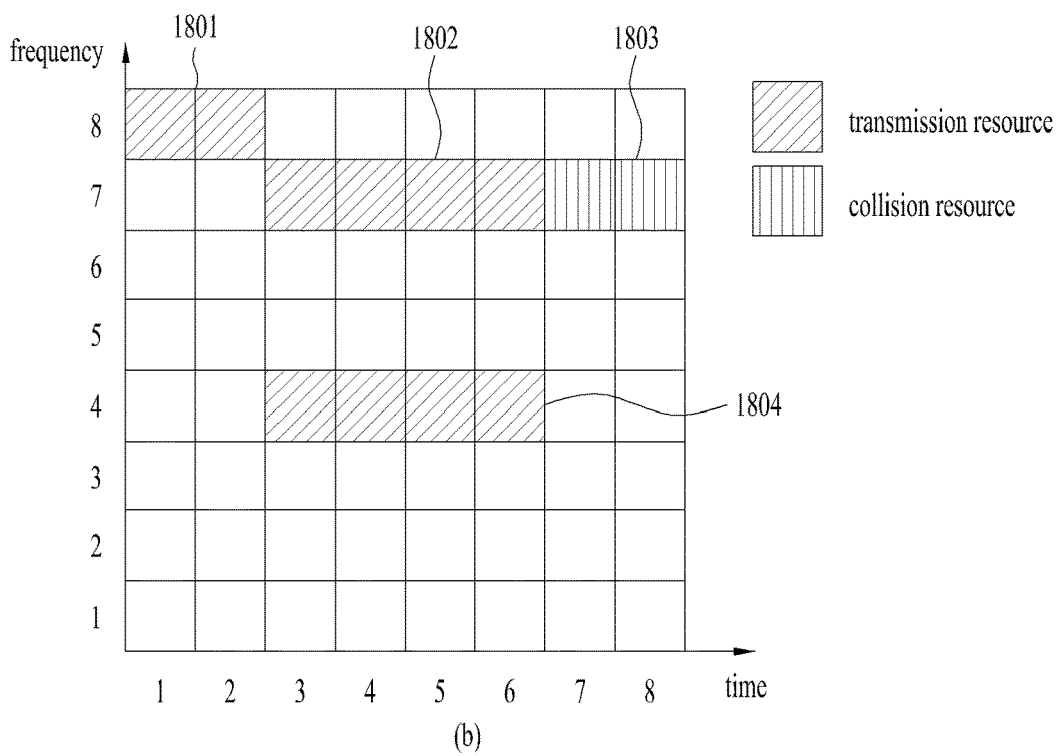

FIG. 18 is a diagram illustrating collision of a hopping resource according to one embodiment.

In an embodiment of FIG. 18, a hopping unit resource has values of NT=1, NF=1, and N=2. For example, NT=1 may correspond to a length of a subframe on a time axis. And, for example, NF=1 may correspond to a length of a subframe on a frequency axis. In particular, in the embodiment of FIG. 18, a hopping unit resource may correspond to a physical resource block pair. And, a rectangular may correspond to a resource block.

In the embodiment of FIG. 18, (a) illustrates transmission resources allocated in a period i and (b) illustrates transmission resources allocated in a period i+1. A first transmission resource 1801 corresponds to a transmission resource used by a first UE, a second transmission resource 1802 corresponds to a transmission resource used by a second UE, a third transmission resource 1803 corresponds to a transmission resource used by a third UE, and a fourth transmission resource 1804 corresponds to a transmission resource used by a fourth UE. In the embodiment of FIG. 18, each of the transmission resources hops according to a predetermined rule as a period proceeds.

Referring to FIG. 18 (a), a half-duplex problem occurs between the first transmission resource 1801 and the second transmission resource 1802. And, referring to FIG. 18 (b), the half-duplex problem between the first transmission resource 1801 and the second transmission resource 1802 is solved with the help of hopping. Similarly, a half-duplex problem between the third transmission resource 1803 and the fourth transmission resource 1804 can be solved using hopping.

As mentioned in the foregoing description, a remaining resource or an added resource can be allocated to a resource contiguous to a hopped resource on a time axis. In particular, the fourth transmission resource 1804 can be allocated to resources (time resources 5 and 6 in FIG. 18 (b)) contiguous to a resource to which a remaining resource hops after a preceding hopping unit resource hops on a time axis.

However, referring to FIG. 18 (b), the second transmission resource includes 3 hopping unit resources. In this case, the third transmission resource 1803 is collided with a part of the second transmission resource 1802 in the time resources 7 and 8. In FIG. 18 (b), the second transmission resource 1802 can be transmitted using first 4 resource blocks only to protect the third transmission resource 1803. For example, the second transmission resource 1802 can be transmitted in $3^{rd}$, $4^{th}$, $5^{th}$, and $6^{th}$ time resources only.

In particular, if a collision occurs between transmission resources, a problem may exist in a method of handling the collision. For example, when hopping is performed, a hopped transmission resource of a first UE can be collided with a $k^{th}$ hopping unit resource of a second UE. Referring to FIG. 18 (b), a $3^{rd}$ hopping unit resource of the transmission resource 1802 of the second UE is collided with the transmission resource 1803 of the third UE. In this case, transmission of a collided resource can be dropped. In this case, a value of the k may correspond to a value fixed between a transmission UE and a reception UE. And, the value of the k can also be indicated via higher layer signaling (e.g., RRC signaling). The value of the k can be differently configured according to a UE. For example, if the k value is differently configured according to a UE, UEs can transmit a message in a different order. For example, the k value of the first UE may correspond to 3 and the k value of the second UE may correspond to 1. If transmission of the second UE is collided with transmission of the first UE from the first hopping unit resource, it is anticipated that the second UE will drop the transmission. In this case, the first UE can transmit a message without dropping the transmission, thereby increasing resource efficiency.

And, it may consider a redundancy version as well. For example, a $k^{th}$ hopping unit resource may correspond to a first redundancy version (e.g., redundancy version 0). And, as mentioned in the foregoing description, a hopping unit resource appearing after the $k^{th}$ hopping unit resource can be dropped. In this case, transmission of an undropped remaining resource is meaningless to a receiving end. In particular, when a message is transmitted for the first time, it may be preferable to retransmit the whole message using a different resource rather than transmit the message while dropping a part of the message.

For example, referring to FIG. 18 (b), the second UE may determine that it is not preferable to transmit 4 resource blocks only. Hence, the second UE can determine a new transmission resource according to methods described in the following rather than transmits 4 resource blocks only. Embodiments described in the following can be applied to a case that a collision occurs between transmission resources after hopping is performed.

For example, a transmission resource of a first UE can be collided with a $k^{th}$ (k is a natural number equal to or greater than 1) hopping unit resource of a second UE. The first UE drops a collided part only and may be able to transmit the remaining part as it is. In the aspect of a reception UE, this can be comprehended as puncturing is performed on a part collided with the second UE among a message transmitted by the first UE. Hence, the reception UE can decode the partially punctured message of the first UE. For example, the $k^{th}$ hopping unit resource of the second UE can be used for an important transmission such as a redundancy version. In this case, if the transmission of the second UE is protected, it is able to guarantee reliability for a resource.

For example, a transmission resource of a first UE can be collided with a $k^{th}$ hopping unit resource of a second UE. In this case, the first UE can drop transmissions of all transmission resources including the collided resource appearing after the collided resource in a corresponding hopping period. In the aspect of a reception UE, this can be comprehended as puncturing is performed on all transmissions appearing after the collided resource among transmissions transmitted by the first UE. In this case, the first UE drops a transmission of a hopping period in which a collision occurs and may be able to determine a transmission resource in a next hopping period based on a position of a dropped transmission resource. If a collision occurs at a $k^{th}$ hopping unit resource, since it is highly probable that a collision occurs in the following transmission, it is able to protect transmission of the second UE by dropping transmission of the first UE.

When a resource collision occurs, it may consider a priority of a message. For example, a priority of a control channel may be different from a priority of a data channel. And, a priority may vary depending on control information included in the control channel. And, each of data channels may have a different priority.

When a transmission resource of a first UE is collided with a $k^{th}$ hopping unit resource of a second UE, dropping of a transmission can be determined based on a priority of a transmitted message. For example, when a transmission resource of the first UE is collided with a transmission resource of the second UE, a message of a higher priority is transmitted in a collided resource and a message of a lower priority can be dropped. For example, the control channel may have a priority higher than a priority of the data channel.

When a transmission resource of a first UE is collided with a $k^{th}$ hopping unit resource of a second UE, partial dropping of a transmission can be determined based on a priority of a transmitted message. For example, a transmission of the first UE may have a priority higher than a priority of a transmission of the second UE. In this case, the second UE can drop transmission in all hopping unit resources collided with the transmission of the first UE. And, a transmission of the second UE may have a priority higher than a priority of a transmission of the first UE. In this case, as mentioned in the foregoing description, the first UE can determine whether to drop at least a part of a transmission. For example, the second UE may drop a collided resource only or drop all transmission resources after a collision.

In the aforementioned embodiments, at least a part of transmissions can be dropped based on a collision. In this case, it may be able to shift a collided resource according to a predetermined pattern rather than drop the collided resource.

For example, a transmission resource of a first UE can be collided with a $k^{th}$ hopping unit resource of a second UE. In this case, the first UE can shift a collided resource on a time axis as much as a hopping unit resource. However, if at least a part of the collided resource shifted on the time axis deviates from a resource pool, the first UE can drop a transmission of the collided resource or a transmission of a corresponding transmission resource including the collided resource. In this case, in order to protect the $k^{th}$ hopping unit resource of the second UE only, it may shift the transmission resource of the first UE as much as the $k^{th}$ hopping unit resource. Yet, it may shift all collision resources collided with the transmission resource of the second UE.

For example, the transmission resource of the first UE can be allocated to the $1^{st}$ to $3^{rd}$ subframes. And, the transmission resource of the second UE can be allocated to the $2^{nd}$ to 4th subframes. And, k can be configured by 2. In this case, the transmission resource of the second UE can be shifted to the 3rd to $5^{th}$ subframes. And, the transmission resource of the second UE can be shifted to the $5^{th}$ to $7^{th}$ subframes to shift all collision resources. In this case, the $7^{th}$ subframe may deviate from a region of a resource pool for transmitting a message. In this case, the second UE may drop a transmission in the $7^{th}$ subframe or drop all transmissions in the $5^{th}$ to $7^{th}$ subframes. In the aforementioned embodiments, although a collided resource is simply shifted, the collided resource can be shifted according to a predetermined pattern.

The aforementioned embodiments can be applied to a control channel and a data channel, respectively. Yet, control information can be associated with a resource to which data corresponding to the control information is allocated. In this case, a transmission resource of the control information and a transmission resource of the data can be handled as a message set. The aforementioned embodiments can be applied to the message set. For example, the data can be transmitted in a resource contiguous to a resource in which the control information is transmitted. In this case, in order to protect the control information, k can be set to 1. In this case, as mentioned in the foregoing description, a transmission resource of a different UE collided with the resource of the control information can be dropped or shifted. By doing so, the control information can be protected.

And, it may be able to configure a resource pool for additional transmission. It may assume that each of UEs performs transmission as much as a hopping unit resource. And, hopping is performed in a first resource pool. And, additional transmission can be performed in a second resource pool different from the first resource pool. For example, the second resource pool may correspond to a resource pool newly configured to perform additional transmission. And, one or more resource pools can be configured for additional transmission. And, additional transmission can be performed in a unit of a hopping unit resource in the resource pool configured for the additional transmission. And, for example, a UE can perform transmission as much as a hopping unit resource in a resource pool configured for additional transmission.

For example, 3 resource pools can be configured. The 3 resource pools can include a first resource pool, a second resource pool, and a third resource pool. And, a hopping unit resource can be configured by 2 resource blocks. For example, a UE can receive a message of 6 resource blocks. For clarity, 6 resource blocks may include a first hopping unit resource, a second hopping unit resource, and a third hopping unit resource. In this case, the UE can transmit the message in a manner of dividing the message into 3 resource pools. The UE can be configured to transmit 2 resource blocks in each of the resource pools. For example, the UE can transmit the first hopping unit resource in the first resource pool, transmit the second hopping unit resource in the second resource pool, and transmit the third hopping unit resource in the third resource pool. And, each hopping unit resource can perform hopping in each of the resource pools.

Each of the resource pools can be defined according to a type of a transmitted message. For example, a resource pool can be used for transmitting a data channel or a control channel. For example, it may be able to configure a resource pool for transmitting a control channel associated with a transmission of data in advance. And, it may be able to designate a resource pool in which data transmission is performed via a single control channel. And, for example, control information indicates a resource pool for transmitting data and a resource pool for transmitting the remaining data can be determined based on the resource pool indicated by the control information. And, the control information may indicate all data pools for transmitting data. The resource pool for performing additional transmission may correspond to a resource pool which is added irrespective of a predetermined resource pool. Yet, the resource pool for performing additional transmission may correspond to a resource region for performing additional transmission configured in a resource pool. A resource pool may include resource regions for performing a plurality of additional transmissions. An additional resource region can be designated via higher layer signaling (e.g., RRC signaling). And, each of transmission resources can perform hopping in a resource pool for performing additional transmission or a resource region for performing additional transmission.

Figure 19:
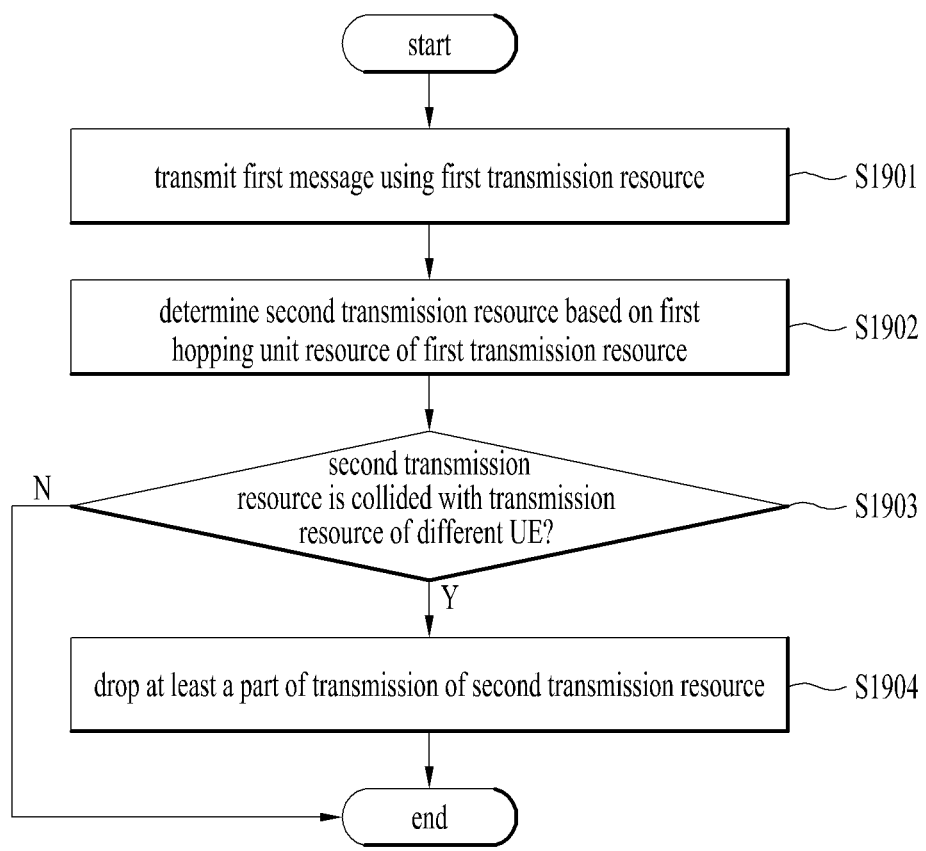
FIG. 19 is a flowchart for a method of performing hopping according to one embodiment.

FIG. 19 is a flowchart for a method of performing hopping according to one embodiment.

Referring to FIG. 19, a UE can transmit a first message using a first transmission resource [S1901]. And, the UE can determine a second transmission resource based on a first hopping unit resource of the first transmission resource [S1902]. For example, the first transmission resource corresponds to a transmission resource of an $i^{th}$ transmission period and the second transmission resource may correspond to a transmission resource of an $(i+1)^{th}$ transmission period. As mentioned in the foregoing description, the hopping unit resource may correspond to a single physical resource block pair. For example, the UE can perform hopping on a first hopping unit resource of the first transmission resource according to a predetermined hopping rule. The hopping can be performed in a predetermined resource pool. And, the second transmission resource can include a hopped hopping unit resource and one or more hopping unit resources contiguous to the hopped hopping unit resource on a time axis.

The UE can determine whether or not the determined second transmission resource is collided with a transmission resource of a different UE [S1903]. For example, the UE can determine whether or not the second transmission resource is collided with a $k^{th}$ hopping unit resource of a transmission resource of a different UE. As mentioned in the foregoing description, a value of the k can be configured in advance or can be indicated via higher layer signaling. Moreover, the value of the k can be differently configured according to a UE. If there is no collision, the UE can transmit a second message using the determined second transmission resource. Yet, if there is a collision, the UE may drop at least a part of transmission of the second transmission resource [S1904]. For example, the UE may be able to anticipate a collision due to hopping by receiving scheduling assignment of a different UE.

For example, the UE may drop a part collided with a $k^{th}$ hopping unit resource of a different UE only among the second transmission resource. Or, the UE may drop all parts collided with a transmission resource of the different UE including the $k^{th}$ hopping unit resource among the second transmission resource. Or, the UE may drop not only the part collided with the $k^{th}$ hopping unit resource among the second transmission resource but also a part appearing after the part collided with the $k^{th}$ hopping unit resource.

And, as mentioned in the foregoing description, at least a part of the second transmission resource can be dropped based on a priority of the second message. For example, the UE compares a priority of the second message with a priority of a different UE to determine whether to drop at least a part of the second transmission resource. For a method of dropping at least a part of a resource according to a priority, it may refer to the aforementioned embodiments. In relation to a priority, overlapped explanation is omitted. Moreover, a dropped resource can be transmitted in the aforementioned resource pool configured for additional transmission.

Figure 20:
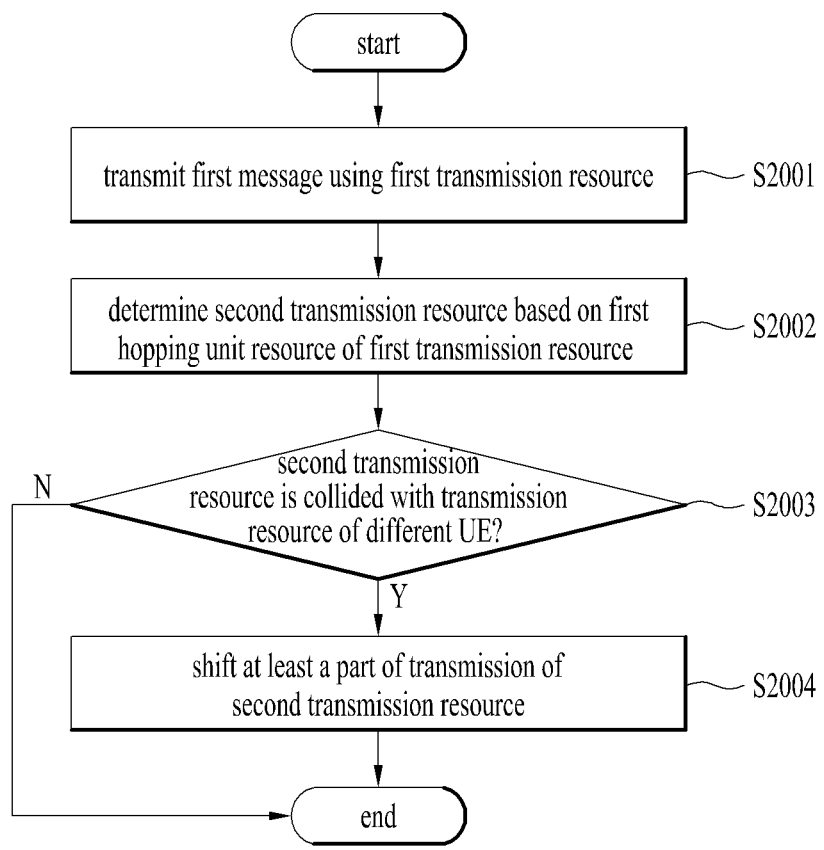
FIG. 20 is a flowchart for a method of performing hopping according to a different embodiment.

FIG. 20 is a flowchart for a method of performing hopping according to a different embodiment.

In an embodiment of FIG. 20, the steps S2001 to S2003 correspond to the steps S1901 to S1903 in FIG. 19. Hence, overlapped explanation is omitted. If there is a collision, the UE may shift at least a part of transmissions of the second transmission resource [S2004]. The shifting of transmission can be performed by a multiple of a hopping unit resource. If a shifted resource deviates from a predetermined resource pool, it may drop the resource or all transmission resources. And, the second transmission resource can be shifted according to a predetermined rule.

Figure 21:
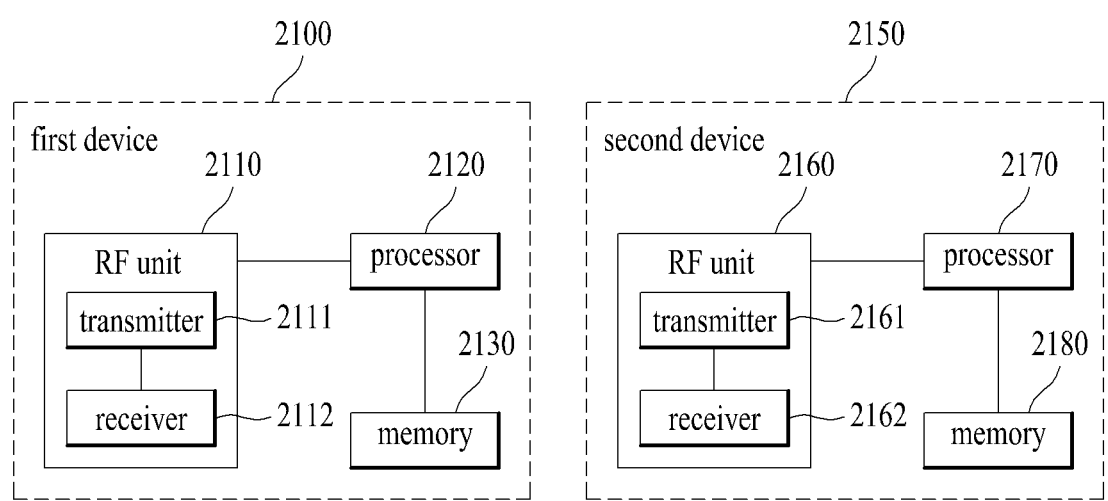
FIG. 21 is a schematic diagram illustrating devices according to an embodiment of the present invention.

FIG. 21 schematically illustrates configuration of devices to which the embodiments of the present invention illustrated in FIGS. 1 to 20 may be applied according to an embodiment of the present invention.

In FIG. 21, each of a first device 2100 and a second device 2150, which are D2D UEs, includes a radio frequency (RF) unit 2110, 2160, a processor 2120, 2170, and, optionally, a memory 2130, 2180. Although FIG. 21 shows configuration of two D2D UEs, a plurality of D2D UEs may establish a D2D communication environment.

Each of the RF unit 2130 and 2160 may include a transmitter 2111, 2161 and a receiver 2112, 2162. The transmitter 2111 and the receiver 2112 of the first device 2100 may be configured to transmit and receive signals to and from the second device 2150 and other D2D UEs, and the processor 2120 may be functionally connected to the transmitter 2111 and the receiver 2112 to control the transmitter 2111 and the receiver 2112 to transmit and receive signals to and from other devices. Meanwhile, the first device 2100 and/or the second device 2150 may be an eNB.

The processor 2120 may perform various kinds of processing on a signal to be transmitted, and then transmit the signal to the transmitter 2111, and process a signal received by the receiver 2112. If necessary, the processor 2120 may store, in the memory 2130, information contained in an exchanged message.

With the above-described structure, the first device 2000 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 21, the first device 2100 may include various additional elements according to device application type. For example, if the first device 2100 is for intelligent metering, the first device 2100 may include an additional element for power measurement and the like. The operation of power measurement may be under control of the processor 2120 or a separately configured processor (not shown).

For example, the second device 2150 may be an eNB. In this case, the transmitter 2161 and receiver 2162 of the eNB may be configured to transmit and receive signals to and from other eNBs, D2D servers, D2D devices, and the processor 2170 may be functionally connected to the transmitter 2161 and receiver 2162 and may be configured to control the process of the transmitter 2161 and the receiver 2162 transmitting and receiving signals to and from other devices. In addition, the processor 2170 may perform various kinds of processing on a signal to be transmitted, transmit the signal to the transmitter 2161, and process a signal received by the receiver 2162. If necessary, the processor 2170 may store, in the memory 2130, information contained in an exchanged message. With the above-described structure, the eNB 2150 may perform the methods of the various embodiments described above.

In FIG. 21, the processors 2120 and 2170 of the first device 2110 and the second device 2150 respectively instruct operations for the first device 2110 and the second device 2150 (for example, control, adjustment, management, etc.). Each of the processors 2120 and 2170 may be connected to the memory 2130, 2180 that stores program code and data. The memories 2130 and 2180 may be connected to the processors 2120 and 2170 to store operating systems, applications, and general files.

The processors 2120 and 2170 of the present invention may be referred to as a controller, a microcontroller, a microprocessor, a microcomputer, or the like. Meanwhile, the processors 2120 and 2170 may be implemented by hardware, firmware, software, or a combination thereof. When embodiments of the present invention are implemented using hardware, the processors 2120 and 2170 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The aforementioned embodiments of the present invention can be applied to various mobile communication systems.

What is claimed is:

1. A method of performing hopping, which is performed by a first user equipment (UE) in a vehicle-to-something (V2X) communication, the method comprising:
   transmitting a first message using a first transmission resource;
   determining a second transmission resource for transmitting a second message by hopping a first hopping unit resource of the first transmission resource according to a predetermined hopping rule; and
   dropping at least a part of transmission of the second transmission resource, when the second transmission resource is collided with a $k^{th}$ hopping unit resource of a transmission resource of a second UE,
   wherein the second transmission resource contains the hopped first hopping unit resource and at least one hopping unit resource contiguous to the hopped first hopping unit resource on a time axis and wherein the k corresponds to an integer equal to or greater than 1.

2. The method of claim 1, wherein the step of dropping the at least a part of the transmission of the second transmission resource comprises the step of dropping a resource collided with the $k^{th}$ transmission unit resource of the transmission resource of the second UE only among the second transmission resource.

3. The method of claim 1, wherein the step of dropping the at least a part of the transmission of the second transmission resource comprises the step of dropping a resource collided with the transmission resource of the second UE only among the second transmission resource.

4. The method of claim 1, wherein the step of dropping the at least a part of the transmission of the second transmission resource comprises the step of dropping a resource collided with the $k^{th}$ transmission unit resource of the transmission resource of the second UE and all resources appearing after the resource collided with the $k^{th}$ transmission unit resource among the second transmission resource.

5. The method of claim 1, wherein a value of the k is configured in advance or is indicated via higher layer signaling.

6. The method of claim 1, wherein the hopping unit resource corresponds to a physical resource block pair.

7. The method of claim 1, wherein the step of dropping the at least a part of the transmission of the second transmission resource comprises the step of dropping the at least a part of the transmission of the second transmission resource based on a priority of the second transmission resource and a priority of the transmission resource of the second UE.

8. A user equipment (UE) performing hopping in a vehicle-to-something (V2X) communication, the UE comprising:
   a transceiver; and
   a processor configured to control the transceiver,
   the processor configured to:
   transmit a first message using a first transmission resource,
   determine a second transmission resource for transmitting a second message by hopping a first hopping unit resource of the first transmission resource according to a predetermined hopping rule,
   drop at least a part of transmission of the second transmission resource, when the second transmission resource is collided with a $k^{th}$ hopping unit resource of a transmission resource of a second UE
   wherein the second transmission resource contains the hopped first hopping unit resource and at least one hopping unit resource contiguous to the hopped first hopping unit resource on a time axis and wherein the k corresponds to an integer equal to or greater than 1.

9. The UE of claim 8, wherein the processor is further configured to drop a resource collided with the $k^{th}$ transmission unit resource of the transmission resource of the second UE only among the second transmission resource.

10. The UE of claim 8, wherein the processor is further configured to drop a resource collided with the transmission resource of the second UE only among the second transmission resource.

11. The UE of claim 8, wherein the processor is further configured to drop a resource collided with the $k^{th}$ transmission unit resource of the transmission resource of the second UE and all resources appearing after the resource collided with the $k^{th}$ transmission unit resource among the second transmission resource.

12. The UE of claim 8, wherein a value of the k is configured in advance or is indicated via higher layer signaling.

13. The UE of claim 8, wherein the hopping unit resource corresponds to a physical resource block pair.

14. The UE of claim 8, wherein the processor is further configured to drop the at least a part of the transmission of the second transmission resource based on a priority of the second transmission resource and a priority of the transmission resource of the second UE.

\* \* \* \* \*